(12) United States Patent
Ricci

(10) Patent No.: US 10,160,339 B2
(45) Date of Patent: Dec. 25, 2018

(54) SMART GRID MANAGEMENT

(71) Applicant: NextEV USA, Inc., San Jose, CA (US)

(72) Inventor: Christopher P. Ricci, Saratoga, CA (US)

(73) Assignee: NIO USA, Inc., San Jose, CA (US)

(*) Notice: Subject to any disclaimer, the term of this patent is extended or adjusted under 35 U.S.C. 154(b) by 116 days.

(21) Appl. No.: 15/237,937

(22) Filed: Aug. 16, 2016

(65) Prior Publication Data
US 2017/0136911 A1 May 18, 2017

Related U.S. Application Data

(60) Provisional application No. 62/255,214, filed on Nov. 13, 2015, provisional application No. 62/259,536, (Continued)

(51) Int. Cl.
*B60L 11/00* (2006.01)
*B60L 11/18* (2006.01)
*G01C 21/34* (2006.01)

(52) U.S. Cl.
CPC ........ *B60L 11/1844* (2013.01); *B60L 11/182* (2013.01); *B60L 11/184* (2013.01); *B60L 11/1842* (2013.01); *B60L 11/1846* (2013.01); *B60L 11/1861* (2013.01); *G01C 21/3469* (2013.01); *B60L 2240/32* (2013.01); *B60L 2240/62* (2013.01); *B60L 2240/80* (2013.01); *B60L 2260/50* (2013.01); *B60L 2260/54* (2013.01); *Y02E 60/721* (2013.01); *Y02T 10/705* (2013.01); *Y02T 10/7005* (2013.01); *Y02T 10/7044* (2013.01); *Y02T 10/7072* (2013.01);
(Continued)

(58) Field of Classification Search
CPC combination set(s) only.
See application file for complete search history.

(56) References Cited

U.S. PATENT DOCUMENTS

| 879,699 A | 2/1908 | Turner |
| 5,311,973 A | 5/1994 | Tseng et al. |

(Continued)

FOREIGN PATENT DOCUMENTS

| CN | 102025184 | 4/2011 |
| CN | 203301194 | 11/2013 |

(Continued)

OTHER PUBLICATIONS

U.S. Appl. No. 15/055,345, filed Feb. 26, 2016, Ricci.
(Continued)

*Primary Examiner* — Anne M Antonucci
*Assistant Examiner* — Renee LaRose
(74) *Attorney, Agent, or Firm* — Sheridan Ross P.C.

(57) ABSTRACT

A control system for a power grid includes a grid load availability evaluator that determines, for a selected time interval, an amount of electrical energy from a power grid that can be used to charge rechargeable electric vehicles by a plurality of charging segments positioned along transportation routes in a transportation network and a switching fabric to regulate, over the selected time interval, the electrical energy provided by the charging segments in accordance with the determined amount of electrical energy from the power grid that can be used to charge rechargeable vehicles.

21 Claims, 19 Drawing Sheets

Related U.S. Application Data filed on Nov. 24, 2015, provisional application No. 62/266,452, filed on Dec. 11, 2015, provisional application No. 62/300,606, filed on Feb. 26, 2016, provisional application No. 62/310,387, filed on Mar. 18, 2016.

(52) U.S. Cl.
CPC .......... *Y02T 10/7291* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| | | | |
|---|---|---|---|
| 5,431,264 | A | 7/1995 | Tseng et al. |
| 5,563,491 | A | 10/1996 | Tseng |
| 5,821,728 | A | 10/1998 | Schwind |
| 6,291,901 | B1 | 9/2001 | Cefo |
| 7,714,536 | B1 | 5/2010 | Silberg et al. |
| D706,212 | S | 6/2014 | Zwierstra et al. |
| 8,768,533 | B2 | 7/2014 | Ichikawa |
| 8,841,785 | B2 | 9/2014 | Theuss et al. |
| 8,841,881 | B2 | 9/2014 | Failing |
| 8,853,999 | B2 | 10/2014 | Haddad et al. |
| 8,912,753 | B2 | 12/2014 | Pudar et al. |
| 9,018,904 | B2 | 4/2015 | Seyerle et al. |
| D736,716 | S | 8/2015 | Hough et al. |
| 9,120,506 | B2 | 9/2015 | Isakiewitsch et al. |
| 9,124,124 | B2 | 9/2015 | Van Wiemeersch et al. |
| 9,412,515 | B2 | 8/2016 | Hyde et al. |
| 2010/0141203 | A1 | 6/2010 | Graziano et al. |
| 2010/0145540 | A1 | 6/2010 | McKenna |
| 2011/0204845 | A1 | 8/2011 | Paparo et al. |
| 2011/0291615 | A1 | 12/2011 | Pandya et al. |
| 2012/0191242 | A1 | 7/2012 | Outwater et al. |
| 2012/0203410 | A1 | 8/2012 | Wechlin et al. |
| 2012/0229085 | A1 | 9/2012 | Lau |
| 2012/0233062 | A1 | 9/2012 | Cornish |
| 2013/0006677 | A1 | 1/2013 | Anglin et al. |
| 2013/0033224 | A1 | 2/2013 | Raedy |
| 2013/0033228 | A1 | 2/2013 | Raedy |
| 2013/0038276 | A1 | 2/2013 | Raedy |
| 2013/0038281 | A1 | 2/2013 | Sakakibara et al. |
| 2013/0103378 | A1 | 4/2013 | Tinnakornsrisuphap et al. |
| 2013/0179057 | A1 | 7/2013 | Fisher et al. |
| 2013/0211988 | A1 | 8/2013 | Dorn et al. |
| 2013/0249479 | A1 | 9/2013 | Partovi |
| 2013/0249682 | A1 | 9/2013 | Van Wiemeersch et al. |
| 2014/0012446 | A1 | 1/2014 | Kumar et al. |
| 2014/0012448 | A1 | 1/2014 | Tripathi et al. |
| 2014/0035526 | A1* | 2/2014 | Tripathi .............. B60L 11/1838 320/109 |
| 2014/0042752 | A1 | 2/2014 | McDermott |
| 2014/0055090 | A1 | 2/2014 | Krause |
| 2014/0062394 | A1 | 3/2014 | Khan et al. |
| 2014/0067660 | A1 | 3/2014 | Cornish |
| 2014/0084682 | A1 | 3/2014 | Covic et al. |
| 2014/0132210 | A1 | 5/2014 | Partovi |
| 2014/0340038 | A1 | 11/2014 | Toggenburger |
| 2014/0354228 | A1* | 12/2014 | Williams ............ B60L 11/1844 320/109 |
| 2014/0372077 | A1 | 12/2014 | Templ |
| 2015/0028849 | A1 | 1/2015 | Covic et al. |
| 2015/0042211 | A1 | 2/2015 | Pan |
| 2015/0061897 | A1 | 3/2015 | Kees et al. |
| 2015/0097438 | A1 | 4/2015 | Aioanei |
| 2015/0097512 | A1 | 4/2015 | Li et al. |
| 2015/0137801 | A1 | 5/2015 | Raedy et al. |
| 2015/0165915 | A1 | 6/2015 | Cun |
| 2015/0188446 | A1 | 7/2015 | Wu et al. |
| 2015/0214738 | A1 | 7/2015 | Covic et al. |
| 2015/0251552 | A1 | 9/2015 | Noack et al. |
| 2015/0280455 | A1 | 10/2015 | Bosshard et al. |
| 2015/0302745 | A1 | 10/2015 | Boys |
| 2015/0306969 | A1 | 10/2015 | Sabripour |
| 2016/0005312 | A1 | 1/2016 | Gao et al. |
| 2016/0024924 | A1 | 1/2016 | Anthony |
| 2016/0049798 | A1 | 2/2016 | Maikawa |
| 2016/0129793 | A1 | 5/2016 | Cronie |
| 2017/0136892 | A1 | 5/2017 | Ricci |
| 2017/0136893 | A1 | 5/2017 | Ricci |
| 2017/0136912 | A1 | 5/2017 | Ricci |

FOREIGN PATENT DOCUMENTS

| | | |
|---|---|---|
| EP | 2711876 | 3/2014 |
| WO | WO 2011/045883 | 4/2011 |
| WO | WO 2011/106506 | 9/2011 |

OTHER PUBLICATIONS

U.S. Appl. No. 15/074,593, filed Mar. 18, 2016, Ricci.
U.S. Appl. No. 15/074,624, filed Mar. 18, 2016, Ricci.
International Search Report and Written Opinion for International (PCT) Application No. PCT/US16/61583, dated Mar. 17, 2017, 11 pages.
"Inductive charging," Wikipedia, 2015, retrieved from https://en.wikipedia.org/wiki/Inductive_charging, 6 pages.
"Meet the Plugless L2," Pluglesspower.com, 2014, retrieved from https://web.archive.org/web/20150920163501/https://www.pluglesspower.com/, 5 pages.
"Someday Your EV Charger May Be the Roadway Itself," MIT Technology Review, 2013, retrieved from http://www.technologyreview.com/news/521761/someday-your-ev-charger-may-be-the-roadway-itself/, 2 pages.
"Wireless Charging for Electric Vehicles," brochure, Qualcomm HALO, 2011, 6 pages.
"Wireless Charging," PowerbyProxi, 2015, retrieved from https://powerbyproxi.com/wireless-charging/, 5 pages.
Brachmann, Wireless induction charging is coming to electric vehicles, IPWatchdog, 2015, retrieved from http://www.ipwatchdog.com/2015/06/18/wireless-induction-charging-is-coming-to-electric-vehicles/id=58756/, 6 pages.
Crawford, "UK motorway to charge electric cars on the move," E&T, 2014, retrieved from http://eandt.theiet.org/news/2014/apr/onroad-charging.cfm, 4 pages.
Gitlin, "Cutting the cord: Ars goes hands-on with Qualcomm Halo wireless car charging," Ars Technica, 2015, retrieved from http://arstechnica.com/cars/2015/04/cutting-the-cord-ars-goes-hands-on-with-qualcomm-halo-wireless-car-charging/, 5 pages.
Gordon-Bloomfield, "Infiniti Delays LE Electric Sedan Production Plans," PluginCars.com, 2013, retrieved from http://www.plugincars.com/print/127405, 2 pages.
Greimel, "Nissan's next Evs: More mainstream, better battery," Automotive News, 2014, retrieved from http://www.autonews.com/article/20140507/OEM05/140509845?template=printart, 2 pages.
Harris, "Your questions answered: inductive charging for road vehicles," the Engineer, 2013, retrieved from http://www.theengineer.co.uk/automotive/in-depth/your-questions-answered-inductive-charging-for-road-vehicles, 8 pages.
Ivanco et al., "Wireless Charging Panel," EV Roadmap 7, 2014, 15 pages.
Li et al, "Energy Management and Control of Electric Vehicle Charging Stations," Electric Power Components and Systems, 2014, vol. 42(3-4), pp. 339-347.
Marks, "Wireless Charging for Electric vehicles hits the road," New Scientist, 2014, Issue 2953, retrieved from https://www.newscientist.com/article/mg22129534-900-wireless-charging-for-electric-vehicles-hits-the-road/, 2 pages.
Morris, "What's up with wireless EV charging," Charged Evs, 2013, retrieved from https://chargedevs.com/features/whats-wireless-ev-charging/, 9 pages.

(56) References Cited

OTHER PUBLICATIONS

Rim, "Wireless Power Transfer Systems for Roadway-powered Electric Vehicles," IEEE, 2014, retrieved from http://tec.ieee.org/2014/09/02/wireless-power-transfer-systems-roadway-powered-electric-vehicles/, 6 pages.
Stewart, "2014 Infiniti EV to Debut Wireless Inductive Charging System," Popular Mechanics, 2011, retrieved from http://www.popularmechanics.com/cars/hybrid-electric/a7331/2014-infiniti-ev-to-debut-wireless-inductive-charging-system/, 4 pages.
Szondy, "BMW developing wireless inductive charging system for electric vehicles," gizmag.com, 2014, retrieved from http://newatlas.com/bmw-induction-charging/32863/, 4 pages.
Taylor, "Unplugged: Audi Readying Wireless Induction Charging for Q7 e-tron," Car and Driver, 2015, retrieved from http://blog.caranddriver.com/unplugged-audi-readying-wireless-induction-charging-for-q7-e-tron/2 pages.
Official Action for U.S. Appl. No. 15/055,345, dated Oct. 19, 2017, 10 pages.
Official Action for U.S. Appl. No. 15/074,593, dated Dec. 18, 2017, 10 pages.
Official Action for U.S. Appl. No. 15/074,624, dated Jun. 16, 2017, 14 pages.
Final Action for U.S. Appl. No. 15/074,624, dated Sep. 29, 2017, 10 pages.
Official Action for U.S. Appl. No. 15/074,593, dated Apr. 16, 2018, 7 pages.
Official Action for U.S. Appl. No. 15/074,624, dated Mar. 12, 2018, 13 pages.
International Preliminary Report on Patentability for International (PCT) Application No. PCT/US16/61583, dated May 24, 2018, 10 pages.
Notice of Allowance for U.S. Appl. No. 15/055,345, dated May 11, 2018, 12 pages.
Notice of Allowance for U.S. Appl. No. 15/074,593, dated Sep. 5, 2018, 6 pages.
Final Action for U.S. Appl. No. 15/074,624, dated Aug. 27, 2018, 24 pages.

* cited by examiner

SMART GRID MANAGEMENT

CROSS REFERENCE TO RELATED APPLICATION

The present application claims the benefits of U.S. Provisional Application Ser. No. 62/255,214, filed Nov. 13, 2015; 62/259,536, filed Nov. 24, 2015; 62/266,452, filed Dec. 11, 2015; 62/300,606, filed Feb. 26, 2016; and 62/310,387, filed Mar. 18, 2016, each of which is incorporated herein by this reference in its entirety.

FIELD

The disclosure relates generally to rechargeable electric vehicles and particularly to roadway-based charging of rechargeable electric vehicles.

BACKGROUND

Electric vehicles are widely considered an answer to global air pollution from fossil fuel vehicles. With the exception of the Tesla Model S, however, most electric vehicles cannot travel 100 miles on a full charge. Tesla buyers pay a significant premium for the larger battery packs needed to travel longer distances. Even then, battery vehicles typically must be recharged for hours before they're ready to roll again—something that makes a long trip a chore.

Wireless charging on roadways (known as wireless power transfer (WPT)) has been proposed to address the limited travel range of electric vehicles. Wireless charging uses the following laws of physics: (a) a wire carrying an electric current produces a magnetic field around the wire (Ampere's Law); (b) a coil intersecting a magnetic field produces a voltage in that coil (Faraday's Law); and (c) electromagnetic power transfer between electrical circuits across an air gap can be achieved using magnetic field coupling at resonance (Tesla's Law). Based on these laws, wireless power transfer (WPT), uses a power supply providing alternating electric current in a primary charging coil embedded in a roadway to produce a time-changing magnetic field. The variable magnetic field induces an electric current (producing a magnetic field) in a secondary solenoid winding mounted under a vehicle floor. The induced alternating current and voltage are then rectified to direct current (in an inverter) to recharge an onboard battery or other energy storage device. When a transmitter radio frequency magnetic field matches the receiver frequency, the inductive power transfer (IPT) is called "magnetic resonance".

While WPT has been effective in powering buses of known battery capacity over known routes with known charging requirements, it has not been applied to powering electric or hybrid vehicles having different battery capacities and charge levels over varying routes in the presence of fossil fuel-powered vehicles. No one has anticipated how to manage a distributed roadway charging system servicing many different types of REVs with different charging demands (let alone with the REVs dispersed among large numbers of non-REV vehicles which will also be passing over the roadway charging units) or how to manage the grid, particularly a smart grid, with a large number of REVs added to already constrained resources.

Current WPT systems have further failed to provide a mechanism for electric vehicles to contribute power from on board storage to the grid. Such power can be generated and stored through such electric vehicle operations as regenerative braking.

SUMMARY

These and other needs are addressed by the various aspects, embodiments, and/or configurations of the present disclosure.

A control system for a power grid can include:
a processor; and
a computer readable medium, coupled to the processor, comprising processor executable instructions that cause the processor to execute a grid load availability evaluator.

The grid load availability evaluator determines, for a selected time interval, an amount of electrical energy from a power grid that can be used to charge rechargeable electric vehicles by a plurality of charging segments, the charging segments being positioned along transportation routes in a transportation network and regulates, via a switching fabric and over the selected time interval, the electrical energy provided by the charging segments in accordance with the determined amount of electrical energy from the power grid that can be used to charge rechargeable vehicles.

A control system for a rechargeable vehicle charging network can include:
a processor; and
a computer readable medium, coupled to the processor, comprising processor executable instructions that program the processor to control a switching fabric. The switching fabric regulates, over the selected time period, electrical energy provided by the charging segments in accordance with a predetermined amount of electrical energy from a power grid that can be used to charge rechargeable vehicles.

A method can include the steps of:
(a) determining, by a processor executing a grid load availability evaluator and for a selected time interval, an amount of electrical energy from a power grid that can be used to charge rechargeable electric vehicles by a plurality of charging segments, the charging segments being positioned along transportation routes in a transportation network; and
(b) providing, by a switching fabric, over the selected time period the determined amount of electrical energy to charge rechargeable vehicles.

The determined amount of electrical energy from the power grid that can be used to charge rechargeable vehicles can be dependent upon one or more of current power consumption levels by grid users other than rechargeable electric vehicles, historical power consumption levels by rechargeable electric vehicles and/or other grid users, and number of rechargeable electric vehicles currently on the transportation network.

The grid load availability evaluator can determine a current energy usage for all grid users, including rechargeable electric vehicles, and/or estimate future usage over the selected time interval for all grid users. Based on the relative priorities of different classes of grid users, it can set a budget for each class of grid users, the rechargeable electric vehicles being a class of grid users and the budget for each class of grid users being an amount of electrical energy from the power grid that can be used by the class of grid users over the selected time interval.

The grid load availability evaluator can determine an amount of electrical energy so far consumed by rechargeable electric vehicles over the selected time interval, a number of rechargeable electric vehicles requesting a charge during the selected time interval, a number of rechargeable electric vehicles that have received a charge during the selected time interval, and/or a historic amount of electrical energy consumed by rechargeable electric vehicle charging over a historic time interval and estimate, based thereon, a likely amount of power from the grid to be consumed by rechargeable electric vehicles over the remainder of the selected time interval.

The computer readable medium can include a bidirectional load balance mechanism that can estimate available power contributions from rechargeable electric vehicles to the power grid over the selected time interval and provide the estimated available power contribution to the grid load availability evaluator for use in determining the budgets for each class of grid users.

The computer readable medium can include a vehicle tracker that identifies rechargeable electric vehicles currently using the transportation network and tracks a last known position in the transportation network of each of the identified rechargeable electric vehicles.

The computer readable medium can include a vehicle router that directs the identified rechargeable electric vehicles to one of the charging segments to receive a charge, thereby load balancing the rechargeable electric vehicles over the charging segments.

The computer readable medium can include a vehicle analyzer that communicates with each of the rechargeable electric vehicles to obtain information regarding one or more of identity of the owner or operator of the rechargeable electric vehicle, residence of the rechargeable electric vehicle owner or operator, utility account of the rechargeable electric vehicle owner or operator, type of the rechargeable electric vehicle, priority level of the rechargeable electric vehicle, make and/or model of the rechargeable electric vehicle, current charge level of the rechargeable energy storage of the rechargeable electric vehicle, current charging requirement of the rechargeable energy storage of the rechargeable electric vehicle, destination of the rechargeable electric vehicle, purpose of the current travel of the rechargeable electric vehicle, spatial location of the rechargeable electric vehicle relative to a charging segment, an electronic calendar of an operator of the vehicle, a normal schedule for the operator, and number of occupants of the rechargeable electric vehicle.

The vehicle analyzer can then determine, for each rechargeable electric vehicle, one or more of an amount of electrical charge stored by the rechargeable electric vehicle and an amount of charge currently required by the rechargeable electric vehicle.

The computer readable medium can include a vehicle router that, based on the amount of electrical charge stored by the rechargeable electric vehicle or currently required by the rechargeable electric vehicle, can direct each of the rechargeable electric vehicles to one of the charging segments to receive a charge, thereby load balancing the rechargeable electric vehicles over the plurality of charging segments.

Dual mode vehicles and roadway charging segments can not only transfer power to REVs but also receive power contributions from REVs. This can provide substantial benefits to the smart grid by enabling REVs to not only be power consumers but also be power contributors, particularly in times of peak power usage. This can enable REVs and hybrid vehicles to capture and store electrical energy through regenerative braking for later transfer to the grid.

The roadway charging segments can allow rechargeable electric vehicles to charge while in motion. This can assist drivers with rechargeable electric vehicles in avoiding frequent stops to recharge their vehicles. The charge transfer can be highly efficient and enable drivers to remain on the road as long as he or she desires.

The present disclosure can provide a number of other advantages depending on the particular aspect, embodiment, and/or configuration. The control system can regulate charging of electric or hybrid vehicles having different battery capacities and charge levels over varying routes. It can do this by managing a distributed roadway charging system servicing many different types of REVs with different charging demands and requirements. It can manage the grid, particularly a smart grid, with a large number of REVs added to already constrained power resources. It can efficiently determine and allocate temporally changing power budgets among various classes of power consumers including not only REVs but also commercial and residential users. It can do this using by applying crowd source principals to power management, which views the class of REVs as a large battery. During high load periods, the grid can draw from that battery and pay a premium to the drivers to do so. At times of lesser demand, it can be replaced, possibly at a discount. As battery manufacturers develop better and smaller battery packs, battery packs can power cars sufficient distances, and a grid that operates in this way can incentivize drivers to maintain larger packs and be an integral part of the grid both as a power consumer and contributor.

These and other advantages will be apparent from the disclosure.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any computer-readable storage and/or transmission medium that participate in providing instructions to a processor for execution. Such a computer-readable medium can be tangible, non-transitory, and non-transient and take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "computer readable storage medium" may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium and that can communicate, propagate, or transport a program for use by or in connection with an instruction execution system, apparatus, or device. A computer readable signal medium may convey a propagated data signal with computer readable program code embodied therein, for example, in baseband or as part of a carrier wave. Such a propagated signal may take any of a variety of forms, including, but not limited to, electro-magnetic, optical, or any suitable combination thereof. Program code embodied on a computer readable signal medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "electrical grid" is an interconnected network for delivering electricity from suppliers to consumers. It includes generating stations that produce electrical power, high-voltage transmission lines that carry power from distant sources to demand centers, and distribution lines that connect individual customers.

The term "electric vehicle" (EV), also referred to as an electric drive vehicle, uses one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods include: chemical energy stored on the vehicle in on-board batteries (e.g., battery electric vehicle or BEV), on board kinetic energy storage (e.g., flywheels), and static energy (e.g., by on-board double-layer capacitors). Batteries, electric double-layer capacitors, and flywheel energy storage are forms of rechargeable on-board electrical storage.

The term "hybrid electric vehicle" refers to a vehicle that combines a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own The term "means" as used herein shall be given its broadest possible interpretation in accordance with 35 U.S.C., Section(s) 112(f) and/or 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

The term "rechargeable electric vehicle" or "REV" refers to a vehicle with on board rechargeable energy storage, including electric vehicles and hybrid electric vehicles.

The term "regenerative braking" is an energy recovery mechanism which slows a vehicle or object by converting its kinetic energy into a form which can be either used immediately or stored until needed. The most common form of regenerative brake involves the electric motor of an electric vehicle as an electric generator. In battery electric and hybrid electric vehicles, the energy is commonly stored chemically in a battery, electrically in a bank of capacitors, or mechanically in a rotating flywheel. Hydraulic hybrid vehicles can use hydraulic motors to store energy in the form of compressed air.

The term "satellite-based positioning system" refers to is a space-based navigation system that provides location and time information in all weather conditions, anywhere on or near the Earth where there is an unobstructed line of sight to four or more satellites. Examples include the Global Positioning System (GPS), GLONASS, Gallileo, Beidou, COMPASS, IRNSS, and QZSS.

The term "smart grid" refers to an electrical grid which includes a variety of operational and energy measures, including one or more of smart meters, smart appliances, renewable energy resources, and energy efficiency resources. Electronic power conditioning and control of the production and distribution of electricity can be important aspects of the smart grid. A common element to most definitions is the application of digital processing and communications to the power grid, making data flow and information management central to the smart grid.

The term "smart meter" is usually an electronic device that records consumption of electric energy in intervals of an hour or less and communicates that information at least daily back to the utility for monitoring and billing.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
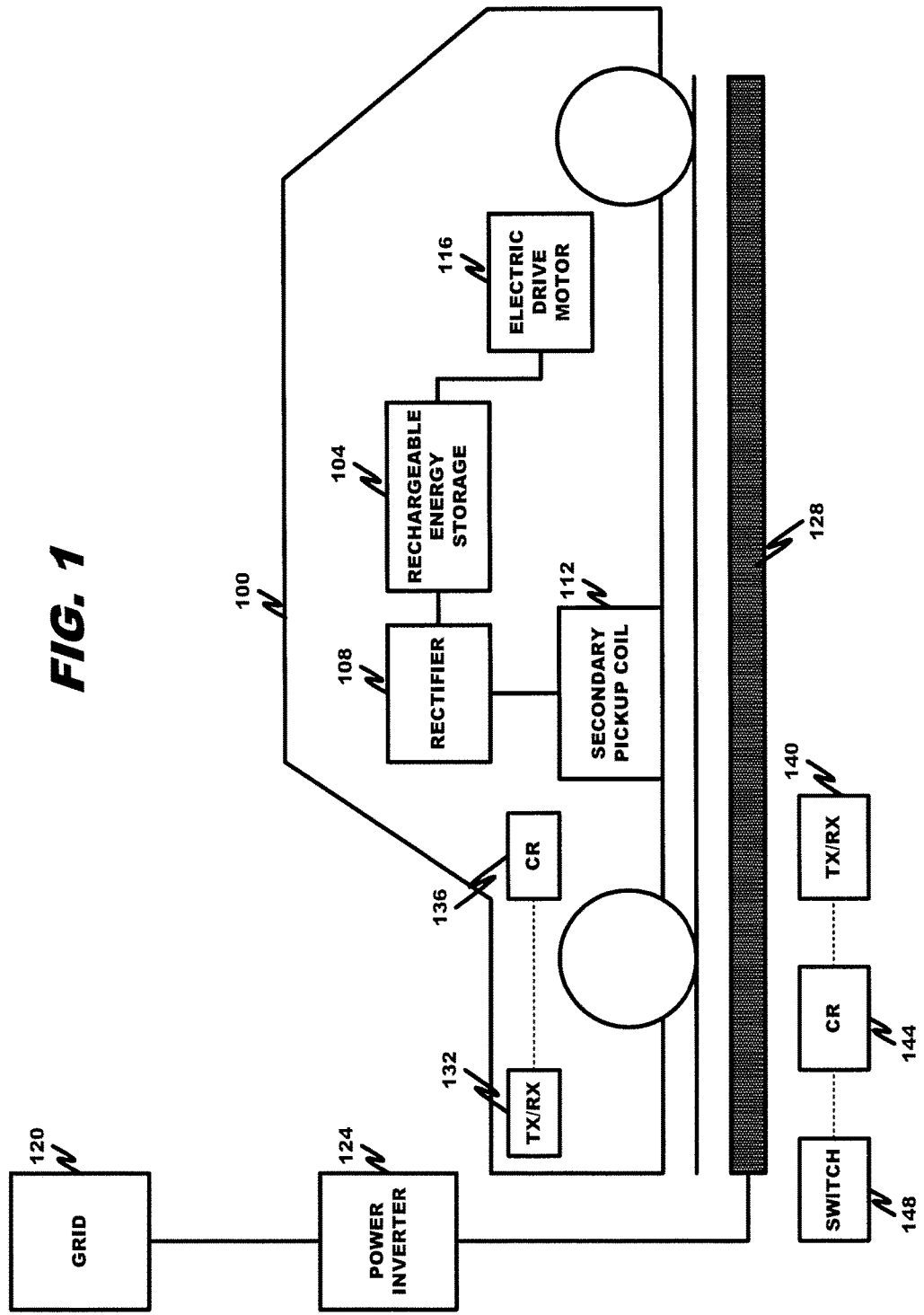
FIG. 1 is a block diagram showing an REV and charging segment according to an embodiment.

With reference to FIG. 1, a rechargeable electric vehicle or REV 100 is depicted in electrical communication with a roadway-based charging system. The rechargeable electric vehicle 100 includes a rechargeable energy source 104 (such as a rechargeable electricity storage system (RESS)) in electrical communication with a rectifier 108 and secondary pickup coil 112 and an electric drive motor 116. The secondary pickup coil 112 can be fixed or stationary on the REV or movable to decrease the air gap between the secondary pickup coil and the roadway surface. A smaller air gap is typically optimal for efficient inductive power transfer ("IPT") to substantially minimize spreading and leakage or the magnetic field. The second coil can be powered automatically to lower itself when an activated charging segment is sensed or the vehicle stops.

The electrical grid 120, such as a smart grid, provides electrical energy to a power inverter 124, which changes direct current (DC) to alternating current (AC) and supplies the AC electrical energy to a charging segment 128. The AC electrical energy typically is in the range of from about 15 to about 40 Hz at a frequency of from about 10 to about 30 kHz. The AC electrical energy passing through the primary coil of the charging segment 128 induces a variable magnetic field. The variable magnetic field, in turn, induces an electric current in the secondary pickup coil 112. The induced AC electrical energy and voltage are then rectified to DC electrical energy to charge the rechargeable energy storage 104. DC electrical energy is provided by the rechargeable energy storage to the electric drive motor 116. For optimal power transfer at the resonance frequency, the primary and secondary coils should be positioned and aligned precisely, with gap size restrictions to limit losses. A closed circuit is used to contain magnetic flux and prevent stray magnetic field emissions.

The charging segment 128 can have many different configurations depending on the application and locations. The charging segment typically includes a primary coil embedded in a roadway. It can have or more power lines with electrical energy flowing in opposing directions to form a loop. The primary coil in the charging segment can be circular or rectangular while the secondary pickup coil can be a circular or double sided coil or single-sided polarized coil with an additional coil for enhanced performance for high power transfer. The secondary pickup coil can include a rectangular core plate to provide potentially higher coupling factors and large lateral tolerances.

Figure 10:
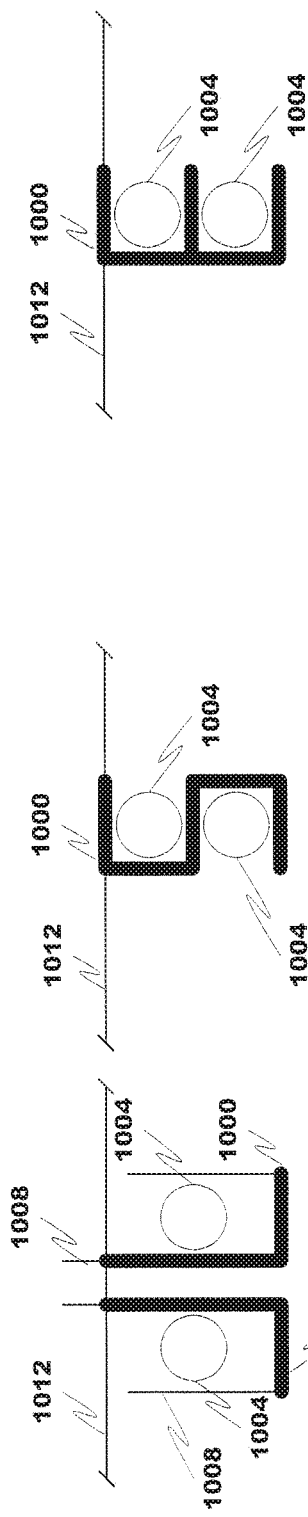
FIGS. 10A-10E show various cross sectional views of charging segments according to an embodiment.

Exemplary charging segment 128 cross-sections (normal to a length of the charging segment) are shown in FIGS. 10A-E. With reference to FIG. 10A, the charging segment includes magnetic components (typically typically iron or an iron alloy) 1000 to direct the magnetic field flux as desired, conductors 1004 to conduct AC electric current, and signal transceivers 1008 to emit and receive wireless signals, all positioned underneath the roadway surface 1012. Other configurations are shown in FIG. 10B ("S" shape), 10C ("E" shaped), 10D ("I" shaped), and 10E (box-shaped). As will be appreciated, other configurations are possible, including H-shaped, T-shaped, C-shaped, D-shaped, and the like.

The charging segment can be located at locations where REVs stop, such as intersections having stop signs or stop lights, bus stops, parking places, roadside pull outs, and the like, and where REVs are in motion, such as in the middle of roadways traveled by REVs. Special REV charging lanes can be employed. Alternatively, the charging segments can be embedded in the roadway traveled by REVs and non-REVs, such as vehicles powered by internal combustion engines.

The charging segment length can vary from about 1 meter to 1 kilometer or more depending on the application and the duty cycle required to recharge the battery of an REV.

Both active and passive shielding can be employed to address safety, health, and environmental issues from stray electromagnetic energy or interference. For instance, magnetic shielding can be positioned under the primary coil to prevent electromagnetic interference to and from nearby sources.

The REV 100 further includes a transceiver (TX/RX) 132 in signal communication with a controller 136. The transceiver 132 emits a signal indicating to a transceiver 140 that an REV is approaching that requires charging. The signal can include a variety of information, including identity regarding the owner or operator of the REV 100 (for billing purposes), residence, account, and other information of the REV owner (so that the power transferred can be billed to the owner's utility bill), type of REV 100 (e.g., type of REV 100 (such as fire fighting, law enforcement, medical, or other emergency vehicle, roadway maintenance vehicle, commercial vehicle, and/or non-commercial vehicle) and/or priority level of REV 100 (fire fighting, law enforcement, medical, and other emergency and roadway maintenance vehicles having a higher priority than commercial and/or non-commercial vehicles), make and/or model of the REV 100, current charge level of the rechargeable energy storage 104, current charging requirement of the rechargeable energy storage 104, destination of the REV (such as from an on board navigation system), spatial location of the REV 100 relative to the charging segment 128 (e.g., spatial coordinates of the vehicle relative to a satellite positioning system such as GPS), an electronic calendar of the operator, a normal schedule for the operator, and number of occupants. The received signal is provided, by the transceiver 140, to a controller 144. The controller 144, when the REV 100 requires charging, enables or activates the charging segment 128 when the REV 100 passes a first predetermined position or location relative to the charging segment 128 and deactivates the charging segment 128 when the REV 100 passes a second predetermined position. The controller 144 can also provide the received information to a control system 200 discussed below.

When no or an improper signal is received by the receiver 140 or when the REV is not spatially aligned with the axis of the primary coil, the controller 144 does not enable or activate the charging segment 128 even though a vehicle is detected. The spatial alignment and proximity of the REV to the charging segment can be determined by any technique, including by a vehicle detection sensor (not shown) (such as a video image processor, infrared detector, ultrasonic detector, microwave/millimeter wave radar, passive acoustic detector array, piezoelectric sensor, photoelectric detector, spread spectrum wideband radar, inductive loop detector, magnetic detector, acceleration detector, and a roadway ground pressure detector). In one configuration, the charging segment is activated automatically when a secondary pickup coil of an REV is sensed a determined or selected distance above the roadway surface, such as when a secondary pickup coil is lowered automatically from beneath the REV to a position closer to the roadway surface.

The duration and magnitude of the AC electrical energy passed through the charging segment can depend on a number of factors. These factors include, without limitation, one or more of make and/or model of the REV 100, current charge level of the rechargeable energy storage 104, current charging requirement of the rechargeable energy storage 104, destination of the REV (such as from an on board navigation system), and number of occupants. For REVs requiring less charge to recharge the rechargeable energy storage 104, for example, less AC electrical energy is passed through the charging segment compared to an REV requiring more charge to recharge the rechargeable energy storage 104.

The transceiver 140 can emit or broadcast a homing (e.g., RF signal to be received by the transceiver 132 to indicate not only a relative orientation of the secondary pickup coil 112 to the charging segment 128 to enable the REV operator to maneuver the secondary pickup coil into proper alignment with the charging segment 128 but also to prompt the controller 136 to emit the signal referenced above to the controller 144. The received signal strength of the homing signal indicates a relative distance of the secondary pickup coil to the charging segment.

The REV can detect the position of the primary coil in the charging segment by sensing a magnitude of the emitted magnetic field. This can be done by a gaussmeter and other well known magnetic field sensors. When the sensed magnitude is greatest, the secondary pickup coil is aligned properly with the charging segment.

The REV can detect the position of the primary coil in the charging segment by sensing the presence and/or magnitude of a weak magnetic field emitted by the charging segment when not actuated fully. In other words, a small electric current can be passed through the primary coil or through a separate coil during REV discovery of the spatial location of, and alignment with, the primary coil and charging segment. The electric current is significantly less than, and more typically no more than 50% of, the magnitude of the electric current passed through the primary coil during REV charging. When the vehicle is properly aligned with the primary coil axis and charging is triggered due to REV proximity to the primary coil, the larger magnitude electric current is passed through the primary coil to cause the charging segment to emit a strong magnetic field and accompany flow of power.

The REV itself, rather than the control system, can command the charging segment to be fully activated as the REV passes over and is in proper position relative to the charging segment. This can be done by the two controllers 136 and 144 communicating with one another.

Precisely controlling when the charging segment is activated fully can be important not only for safety reasons. If the magnetic field emitted by the charging segment misses the REV's secondary pickup coil, the magnetic field can attach to parts of the REV or attract stray metallic objects. Nor is constant fully magnetic field emission by the charging segment energy-efficient.

Figure 9:
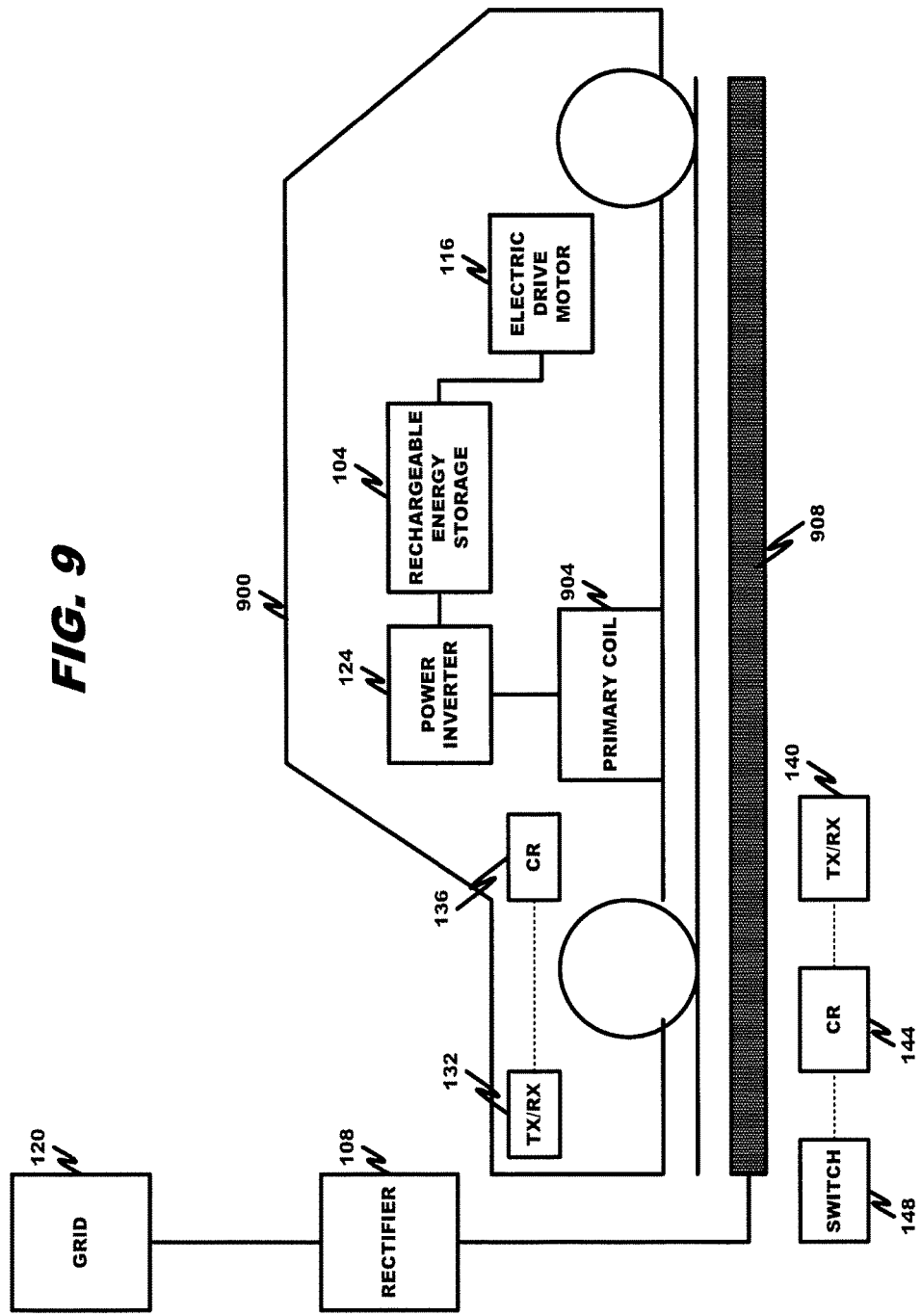
FIG. 9 is a block diagram showing an REV and charging segment according to an embodiment.

The REV and charging segment can provide bidirectional energy flow. FIG. 9 depicts an REV capable of providing, via WPT, electrical energy from the rechargeable energy storage 104 to the grid 120. The REV includes, in addition to the components of FIG. 1 (now shown in FIG. 9), a power inverter to convert DC electrical energy into AC electrical energy, and a primary coil 904 to conduct AC electrical energy and emit a magnetic field. The charging segment can include, in addition to the components described above, a secondary pickup coil 908 in which the magnetic field can induce an AC electrical current and a rectifier that can convert the AC electrical current into DC electrical current to feed back to the grid 120. The REV can generate electrical power through one or more of regenerative braking, an on board internal combustion engine (as in the case of a hybrid EV), and/or photovoltaic energy from solar panels positioned on an exterior of the vehicle.

Figure 2:
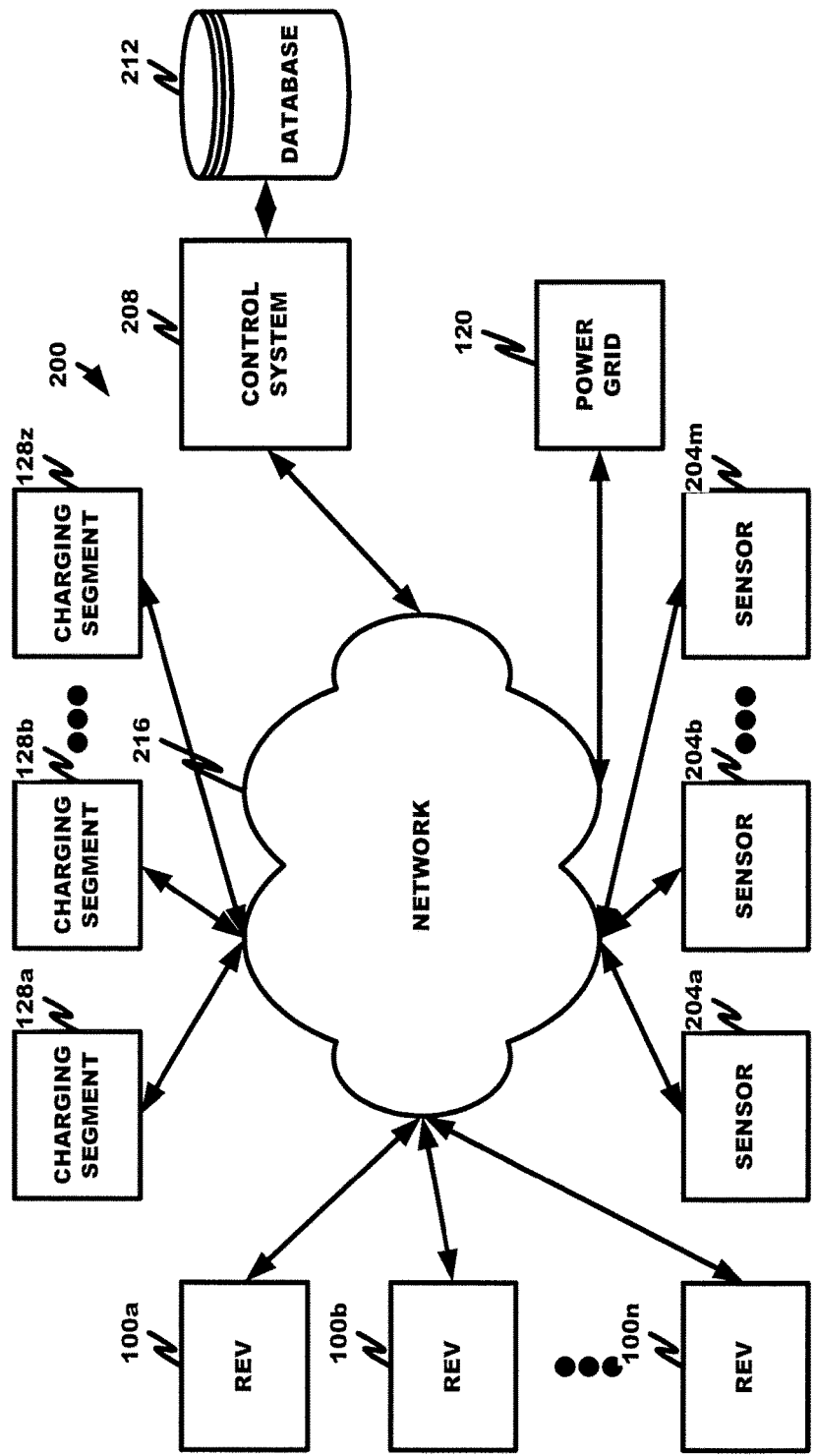
FIG. 2 is a block diagram showing a distributed processing network for REV charging.

FIG. 2 depicts a distributed processing network according to an embodiment.

With reference to FIG. 2, the REV charging system 200 includes sensors 204a-m, power grid 120, charging segments 128a-z, REVs 100a-n, and control system 208 with attached database 212, all interconnected by network 216.

The sensors 204 can be any sensor desirable for an application including without limitation vehicle sensors (discussed above), electrical current sensors (to confirm when electrical current is flowing through each charging segment), voltage sensors (where the electrical current times voltage times time interval provides the amount of electricity consumed by a selected REV during charging at a specific charging segment), a watt-hour meter to determine the amount of electricity used by an REV during charging at a specific charging segment), smart meters, and the like.

Figure 3:
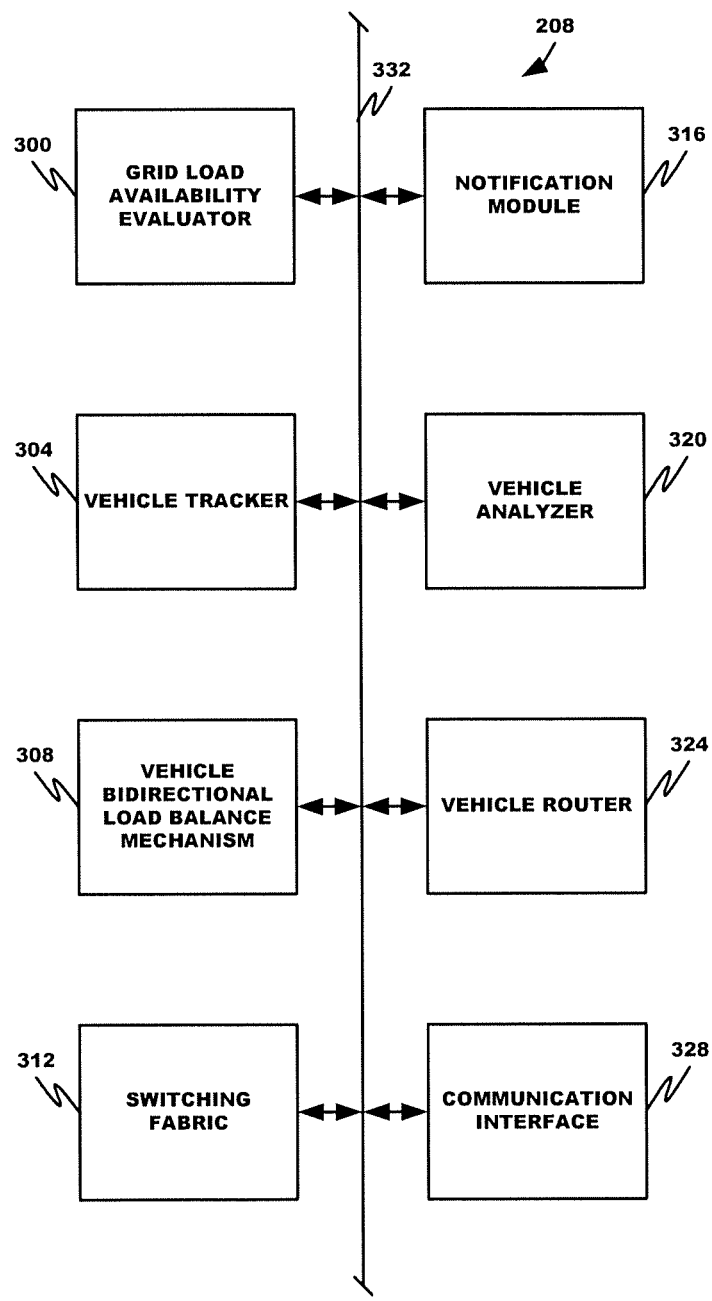
FIG. 3 is a block diagram showing a control system according to an embodiment.

Referring to FIG. 3, the control system 208 includes a grid load availability evaluator 300, a vehicle tracker 304, a vehicle bidirectional load balance mechanism 308, a switching fabric 312, a notification module 316, a vehicle analyzer 320, a vehicle router 324, and a communication interface 328, connected by a bus or wireless and/or wired network 332.

The grid load availability evaluator 300 communicates with the grid 120 to determine an amount of electrical energy that can be used for REV charging during a selected time interval. The grid 120 provides this estimate using current power consumption levels by non-REV users and historical power consumption levels. Factors considered include the power consumed over a selected time interval on the current day of week in prior years, the power consumed over a selected time interval on the current type of day (e.g., business day, weekend, holiday, etc.) in prior years, historic power consumption over the selected time interval for current or predicted weather patterns (e.g., precipitation, temperature, humidity, wind speed and direction, etc.), type of power consumers (e.g., business vs residential users), current day, time of day during the selected time interval, type of current day, traffic levels (to estimate a number of REVs on the roadways) over the selected time interval, number of REVs currently being tracked, and the like.

In some applications, REV users can reserve an amount of charge in advance of receiving the charge. The reservation can simply specify that the REV will need a charge, an amount of charge required, and/or a charging segment(s) to be used for charging along with a time-of-day for the charge to occur. Such users are normally given priority to REV users with no advanced reservation—or REV users simply making a demand for charging due to a current level of on board energy storage charge.

The vehicle tracker 304 identifies REVs that have signaled information to charging segments (as noted above) and tracks the last known positions of the REVs based on the information and/or periodic location signals received from the tracked REVs. This control system can use this information to load balance REV charging loads on selected charging segments by routing REVs to other less used charging segments.

The vehicle bidirectional load balance mechanism 308 determines or estimates a power contribution to the grid 120 from REVs wirelessly power transferring electrical energy from on board rechargeable energy storage 104 to charging segments acting as secondary pickup coils. The estimation over the selected time interval considers factors such as REV power contributions to the grid over a selected time interval on the current day of week in prior years, REV power contributions to the grid over a selected time interval on the current type of day (e.g., business day, weekend, holiday, etc.) in prior years, REV power contributions to the grid over the selected time interval for current or predicted weather patterns (e.g., precipitation, temperature, humidity, wind speed and direction, etc.), traffic levels (to estimate a number of REVs on the roadways) over the selected time interval, number of REVs currently being tracked, and the like. The vehicle bidirectional load balance mechanism 308 provides the estimation power contribution over the selected time interval to the grid load availability evaluator 300 to consider in providing an amount of power available for charging REVs over the selected time interval The load balance mechanism 308 can, at the request of the evaluator 300, request, via the notification module 316 and communication interface 328, REV users to contribute power to the grid 120 via wireless power transfers during periods of peak non-REV power usage.

The switching fabric 312 refers to the hardware and software used to activate and deactivate charging segments for REV charging. As noted, the switching fabric includes switches to switch charging segments on and off, controllers and communication interfaces to receive signals from vehicle sensors indicating an approaching vehicle, transceivers to receive communications from REVs requesting a charge from a nearby or specified charging segment, authentication and verification modules to confirm, as a precursor for activating the charging segment, that the REV is authorized to receive charge from the charging segment (e.g., the REV is owned or operated by a person having an active utility account and/or that the operator of the REV is an authorized person to operate the REV, and billing modules to receive power consumption levels for each REV charged by the charging segments, determine and bill to the REV owner, via his or her utility bill, for the consumed power, and confirm that the REV owner or operator is current on his or her utility bills as a precursor for activating the charging segment.

The notification module 316 receives notifications and/or requests from other system components and, using REV owner and operator records stored in the database 212, generates and transmits, via the communication interface 328, appropriate notifications and/or requests to REV owners and operators via one or more communication modalities, such as texting, email, telephone call, Twitter™, Facebook™, and Flickr™.

The vehicle analyzer 320 communicates with REVs, such as through wireless communications via a transceiver 140 of a nearby charging segment, to obtain information regarding one or more of identity of the owner or operator of the REV 100, residence, account, and other information of the REV owner, type of REV 100 and/or (charging) priority level of REV 100, make and/or model of the REV 100, current charge level of the rechargeable energy storage 104, current charging requirement of the rechargeable energy storage 104, destination of the REV, purpose of the current travel (e.g., emergency or non-emergency), spatial location of the REV 100 relative to the charging segment 128, an electronic calendar of the operator, a normal schedule for the operator (e.g., based on the day of the week such as a business day (e.g., commute to and from work), weekend activities (e.g., church attendance), and the like), and number of occupants. The electronic calendar is accessible by the on board controller 136 of the vehicle and can provide scheduling information for the operator over a selected time period. The scheduling information and normal operator schedule can indicate, for example, meeting times and locations, scheduled tasks and task locations, normal activities and locations, routine operator behavior, travel destinations, and the like. This information enables the vehicle analyzer 320 to estimate the minimum stored charge requirements over the selected time period. The vehicle analyzer 320 determines a currently available degree of charge or currently needed degree of charge for a selected REV.

Based on this information, a (charging) priority level is assigned by the switching fabric 312 to the REV for purposes of controlling power consumption levels of REV users compared to other power users of the grid. The priority level is used by the switching fabric 312 to determine whether an REV is eligible to receive a charge from a nearby charging segment. If REV users as a whole are using too much power from the grid over the selected time interval, only REVs having a priority level of at least a threshold level are entitled to receive currently a charge from the charging segment. If REV users as a whole are using too little power from the grid over the selected time interval, all REVs or REV's having at least a lower priority level are entitled to receive currently a charge from the charging segment. As will be appreciated, the priority level of an REV will change up or down over time in response to changes in one or more of the above variables, the available power for REV charging, and the number of REVs requiring charge over the selected time interval.

The vehicle router 324 receives information from the vehicle analyzer 320, determines, for each roadway segment, a total number of REVs using the roadway segment, a number of REVs requiring charge for the roadway segment, and a charging capacity of the roadway segment. The charging capacity is a function of the number of charging segments on the roadway segment and a maximum power load that can be handled safely by the charging segments. The vehicle router 324 then directs lower priority REVs to other less used roadway segments for charging to load balance over the entire roadway network. The destination of each REV can be used to select an appropriate roadway segment for redirection while avoiding a substantial detour for the redirected REV. The vehicle router 324 can provide directions to requesting REVs to charging segment locations.

The communication interface 328 can be any hardware and software to control communication channels in accordance with one or more protocols. For example, it can be one or more of a parallel, serial, skew-in-parallel, unbalanced, or balanced link or interface, modem, parallel interface, memory interface, synchronous interface, asynchronous interface, and an inter-integrated circuit.

Returning to FIG. 2, the network 216 can be any wired or wireless or wired and wireless network(s), such as a wide area network defined by the TCP/IP suite of protocols.

Figure 12:
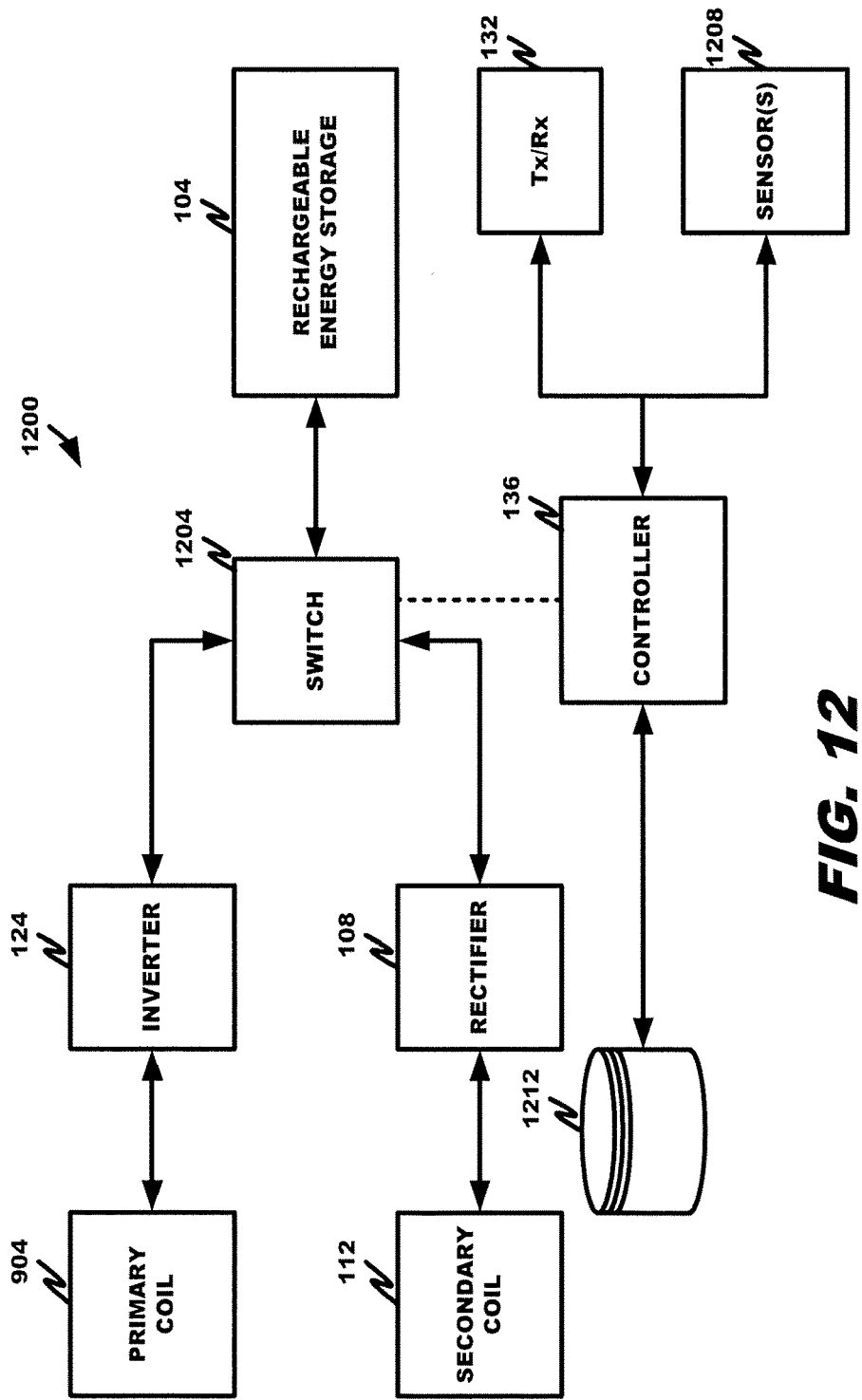
FIG. 12 is a block diagram showing an REV charging system according to an embodiment.

FIG. 12 depicts a vehicle charging subsystem 1200 that can alternatively be a consumer or source of electrical charge. The charging subsystem 1200 interfaces with the rechargeable energy source 104 and includes not only the rectifier 108 and secondary coil 112 to receive an electrical charge from the grid 124 but also the inverter 124 and primary coil 904 to provide an electrical charge to the grid 124. The controller 136 controls the switch 1204 to select which of the charge receiving and providing circuits is active or enabled at a selected point in time.

The vehicle can further include sensor(s) 1208 to monitor on board charge levels and/or electrical charge flow through the currently active circuit. In addition to one or more of the sensors 204a-m referenced above, the sensors 1208 can include a sensor to determine on board charge levels, including without limitation a state of charge gauge, voltmeter, coulomb mounting meter (which measures the charge, or coulomb, input to, and subsequently removed from, the battery—which is accomplished by measuring the charge and discharge current across a low-value series sense resistor between the negative terminal of the battery and the battery-pack ground contact and the voltage drop across the sense resistor is then integrated over time to provide an accurate representation of the state of the battery charge), voltage-to-frequency (VFC) converter (which provides continuous integration and therefore captures variable and pulsed charge or discharge profiles such that the charge and discharge activities can be converted into counts and accumulated over time to represent the charge and discharge flow into and out of the battery but similar results can also be achieved with an oversampled sigma-delta analog-to-digital converter), and battery-capacity monitoring or gas gauge devices that conform to the SBS-IF requirements. A fuel gas gauge device can also responsible for other functions in the rechargeable energy source 104, such as an interface to the lithium ion protection device for rechargeable energy source 104 safety, battery charge termination and/or cell balancing to extend battery cycle life and capacity.

Finally, the vehicle can include an on board database or computer readable medium 1212 to contain processor instructions, historical information received from the sensors, and/or operator or owner related information, such as for billing purposes. A lookup table mapping switch setting against measured on board charge level can also be included in the computer readable medium 1212.

The controller 136 selects between the charge receiving and providing circuits by activating the switch 1204. The controller 136 activates the switch 1204 to select the charge receiving circuit comprising the secondary coil 112 and rectifier 108 in response to a signal from the transceiver 132 (such as a gating signal from the transmitter 140 from a charging segment) and/or from a sensor 1208. The controller 136 activates the switch 1204 to select the charge providing circuit comprising the primary coil 904 and inverter 124 in response to a signal from the transceiver 132 (such as a gating signal from the transmitter 140 from a charging segment) and/or from a sensor 1208. The gating signal can include not only a field containing a mode indicator whether the vehicle is to receive or provide a charge but also a field indicating when the charge is to be received or provided, such as due to proximity or position of the vehicle relative to the charging segment. The sensor signal can automatically cause selection of receiving a charge when the charge level in the rechargeable energy storage 104 is below a selected threshold or providing a charge when the charge level in the rechargeable energy storage 104 is above a selected threshold. The thresholds can be included in the lookup table.

Figure 14:
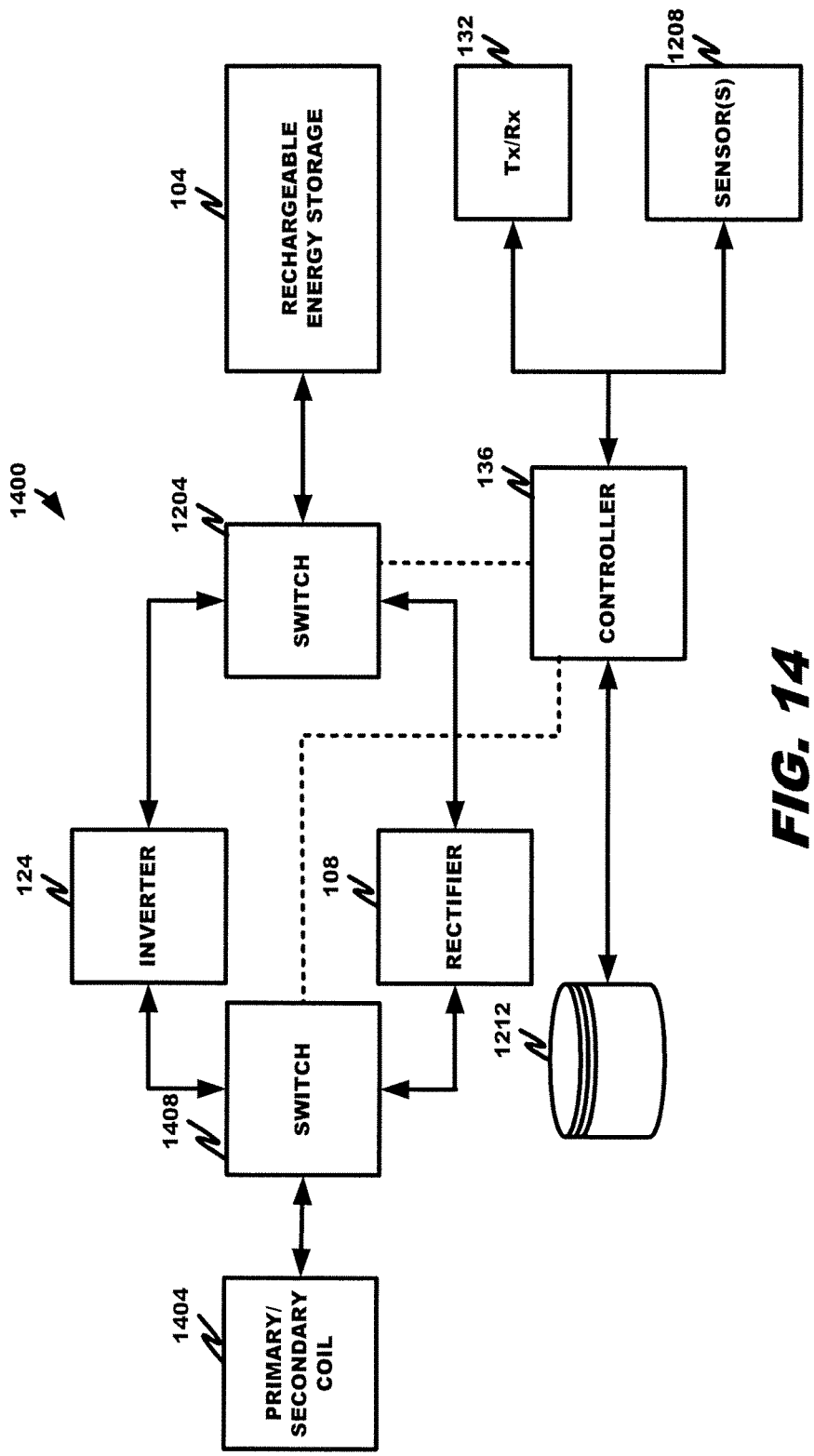
FIG. 14 is a block diagram showing an REV charging system according to an embodiment.

FIG. 14 shows an alternative vehicle charging system configuration 1400 in which both the charge receiving and providing circuits share a common coil 1404, which, depending on mode selected by the controller 136, can act as either a primary or secondary coil. The former circuit is selected by the controller 136 for the charge providing mode while the latter circuit is selected by the controller 136 for the charge receiving mode. A further switch 1408 is provided to enable the controller 136 to activate both switches 1204 and 1408 to route electrical current received from a charging segment through the rectifier 108 or electrical current to be provided to the charging segment through the inverter 124.

Figure 13:
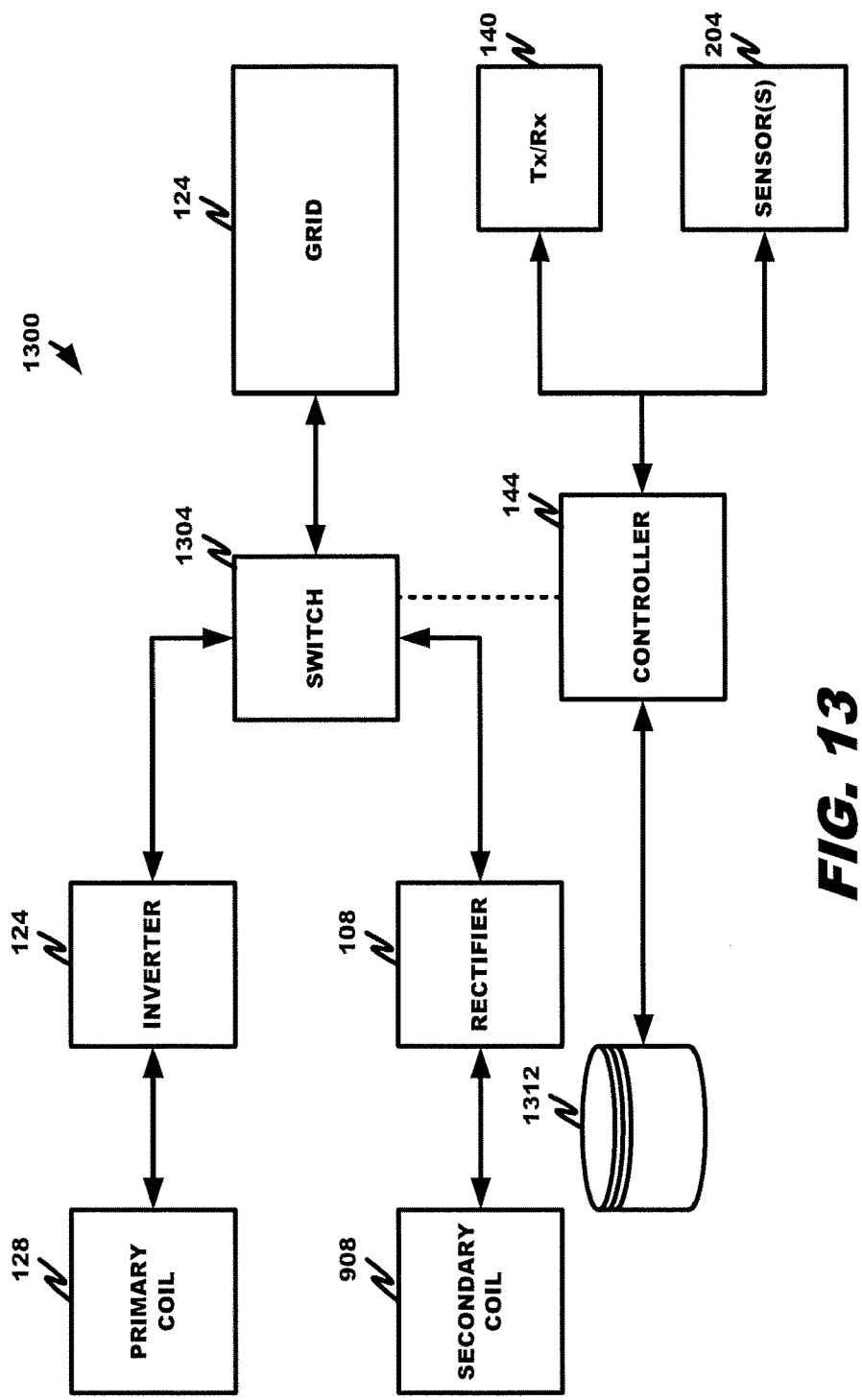
FIG. 13 is a block diagram showing an charging segment subsystem according to an embodiment.

FIG. 13 depicts a charging segment subsystem 1300 that can alternatively be a recipient or source of electrical charge. The charging segment subsystem 1300 interfaces with the grid 124 and includes not only the rectifier 108, and secondary coil 112 to receive an electrical charge from the rechargeable energy source 104 of a vehicle but also the inverter 124 and primary coil 904 to provide an electrical charge to the rechargeable energy source 104. The controller 144 controls the switch 1304 to select which of the charge receiving and providing circuits is active or enabled at a selected point in time.

The subsystem 1300 can include a database or computer readable medium 1312 to contain processor instructions, historical information received from the sensors 204 and billing information from prior charge exchanges with vehicles during a billing period. Charge contributions to the grid 124 from a selected vehicle represents a debit to the vehicle owner's utility account while a charge removal from the grid 124 represents a credit to the vehicle owner's utility account. The computer readable medium 1312 can further include vehicle operator or owner and/or vehicle identity information regarding charge providing or receiving reservations and/or appointments and/or notifications.

The controller 144 selects between the charge receiving and providing circuits by activating the switch 1304. The controller 136 activates the switch 1204 to select the charge receiving circuit comprising the secondary coil 112 and rectifier 108 in response to a signal from the transceiver 140 (such as a gating signal from the transmitter 132 from an oncoming vehicle) and/or from a sensor 204. The controller 144 activates the switch 1304 to select the charge providing circuit comprising the primary coil 128 and inverter 124 in response to a signal from the transceiver 1140 (such as a gating signal from the transmitter 132 from an oncoming vehicle) and/or from a sensor 204. The gating signal can include not only a field containing a mode indicator whether the vehicle is to receive or provide a charge but also a field indicating when the charge is to be received or provided, such as due to proximity or position of the vehicle relative to the charging segment.

Figure 15:
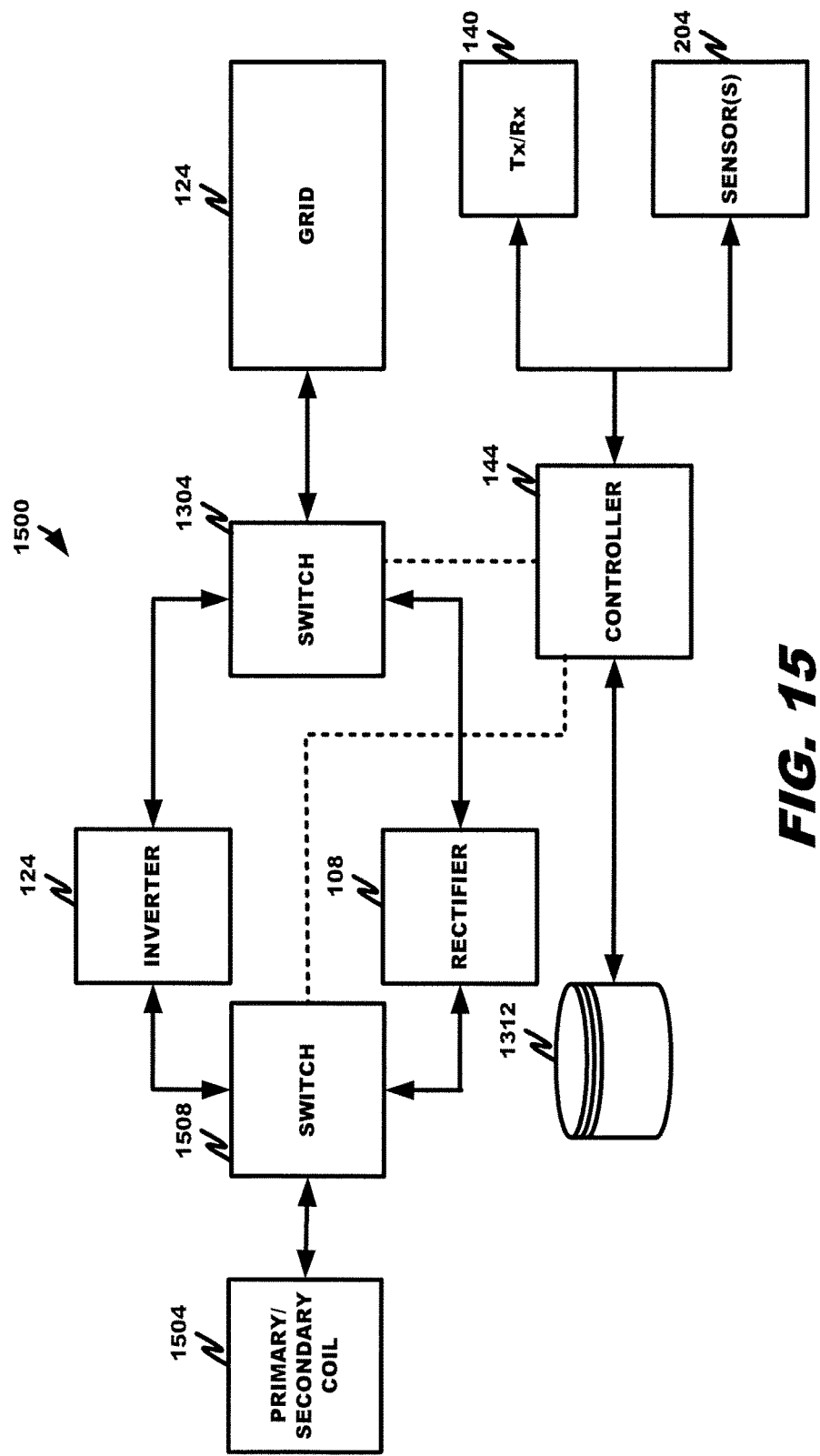
FIG. 15 is a block diagram showing an charging segment subsystem according to an embodiment.
Figure 16:
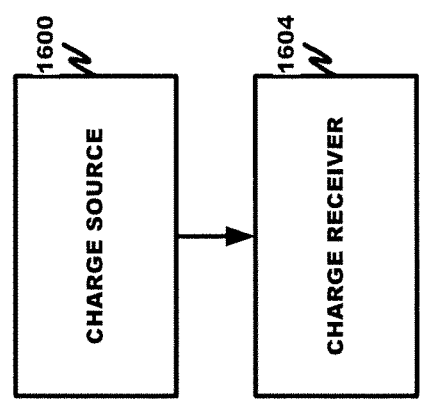
FIG. 16 is a block diagram depicting electrical energy transfer between vehicles.

FIG. 15 shows an alternative charging segment configuration 1500 in which both the charge receiving and providing circuits share a common coil or charging segment 1504, which, depending on mode selected by the controller 144, can act as either a primary or secondary coil. The former circuit is selected by the controller 144 for the charge providing mode while the latter circuit is selected by the controller 144 for the charge receiving mode. A further switch 1508 is provided to enable the controller 144 to activate both switches 1304 and 1508 to route electrical current received from a vehicle through the rectifier 108 or electrical current to be provided to the vehicle through the inverter 124.

Using the charging subsystems of FIG. 12 or 14, charge can be exchanged between rechargeable energy storages. For example, a first vehicle 1600 can provide electrical charge to a second vehicle 1604. In other words, the first vehicle passes electrical charge from the rechargeable energy storage 104 through the inverter 124 and on board coil to the coil of the second vehicle. The second vehicle's on board coil then passes the electrical current through the rectifier 108 to the rechargeable energy storage 104. The coils can be provided in any location on the vehicles provided that the coils can be spaced an appropriate distance from each other. For example, the coils can be located on or projected from a front, rear, or side surface of the vehicle.

Operation of the various components will now be described.

Figure 4:
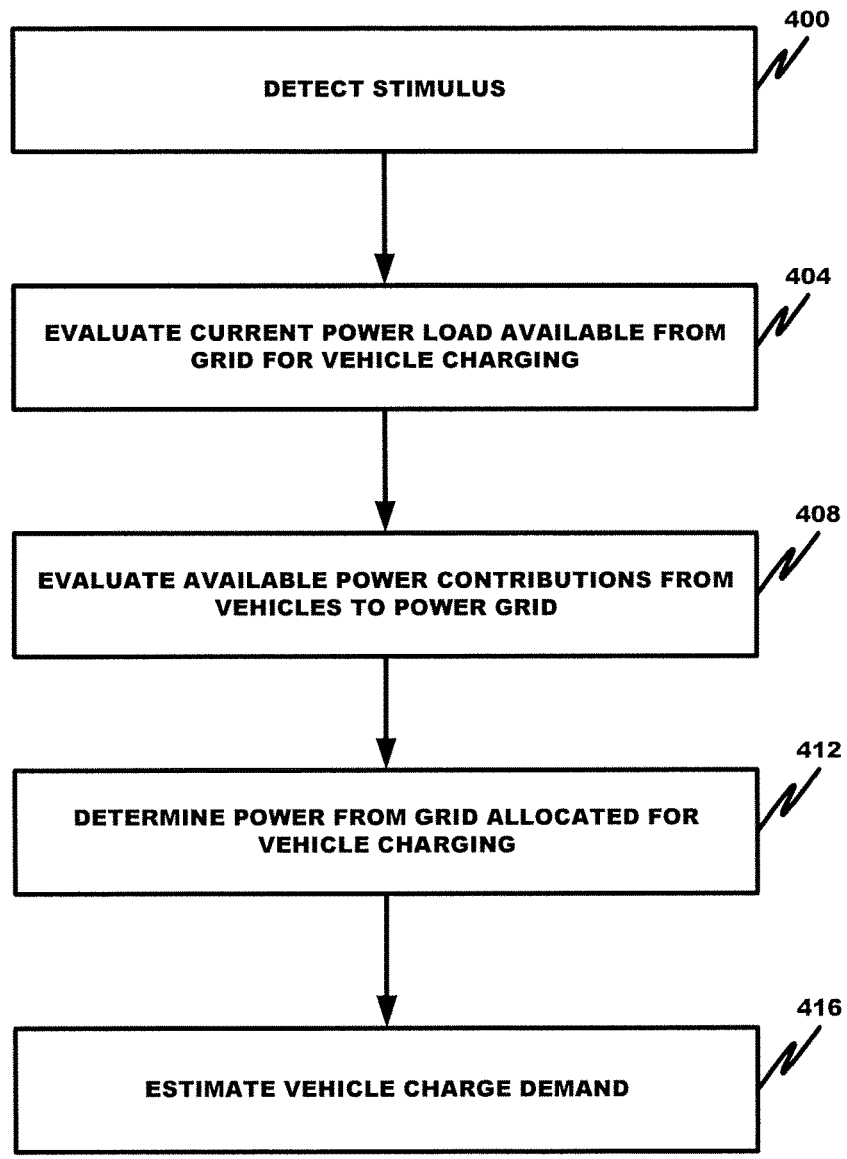
FIG. 4 is a flow chart of logic for the grid load availability evaluator according to an embodiment.

Referring to FIG. 4, the operation of the grid load availability evaluator 300 will be discussed.

In step 400, the control system 208 detects a stimulus, such as passage of a selected time interval, sensor input such as an amount of electrical energy consumed by REV charging bypassing a selected threshold, a number of REV vehicles requesting charging bypassing a selected threshold, a number of REV vehicles that have received a charge surpassing a selected threshold, a current or anticipated power demand of one or more non-REV users exceeding a selected threshold, an interrupt message received from the grid 120, and combinations thereof.

In step 404, the grid load availability evaluator 300 evaluates current power load available from the grid over a selected time interval for vehicle charging. This is done by contacting a computational module in the grid 120 that collectively monitors current energy usage for all REV and non-REV users and/or estimates future energy usage over the selected time interval for all REV and non-REV users and, based on priority of the various users and groups of users (e.g., business users, residential users, REV users, etc.), sets budgets for each group of users.

In step 408, the grid load availability evaluator 300, with assistance from the vehicle bidirectional load balance mechanism 308, evaluates available power contributions from REVs to the power grid 120 over the selected time interval. As battery technology improves and smaller battery packs can power cars sufficient distances, a smart grid that operates in this way can incentivize drivers to maintain larger on board battery packs and be an integral power source for the grid. This is a type of crowd source "funding", or power transfer, to the grid. Said another way, the collection of REVs can be thought of as one huge battery. During peak power usage periods, the grid can draw from that huge battery to assist non-REV power consumers. In this step, the grid load availability evaluator 300 and/or vehicle bidirectional load balance mechanism 308 determines one or more of an amount of electrical energy so far contributed by REV WPT to a charging segment over the selected time interval, a number of REV vehicles notifying a planned WPT to a charging segment over the selected time interval, a number of REV vehicles that have so far transferred WPT to a charging segment over the selected time interval, a historic amount of electrical energy contributed by REV WPT to a charging segment over similar time intervals in the past, and the like. The grid load availability evaluator 300 then estimates a likely amount of WPT to be provided by REVs over the selected time interval.

The grid load availability evaluator 300 and/or vehicle bidirectional load balance mechanism 308 can use price-indexed historic amounts of electrical energy contributed by REV WPT to the charging segments over similar time intervals in the past or other historical data to predict the likely amount of WPT to be provided by REVs over the selected time interval. As will be appreciated, REV operators can be paid for WPT power contributions to the grid. As in the case of peak and non-peak power usage, the price paid by the grid (e.g., power utilities) for WPT power contribution to the grid can be higher during peak power usage and lower during peak power usage periods. Conversely, REV operators receiving WPT power from the grid can be charged higher rates during peak power usage periods and lower rates during non-peak power usage periods. The price paid by the grid to REV operators for power contributions is directly proportional to the amount of power contributed by REV operators; that is, a higher price paid to REV operators by the grid will cause REV operators to contribute more power to the grid while a lower price paid to REV operators by the grid will cause REV operators to contribute less power to the grid.

The grid load availability evaluator 300 and/or vehicle bidirectional load balance mechanism 308 can alternatively or additionally be statistically-based, rule-based, case-based, neural network-based, or employ any other technique for reasoning under uncertainty.

The grid load availability evaluator 300 and/or vehicle bidirectional load balance mechanism 308 can set a price paid to REV operators to yield a selected or desired amount of power provided by REV operators to the grid. When the desired power level is received from REV operators, the price can be lowered, even though the grid may still be in a peak power usage period. The price offered to REV operators can be broadcast to REV operators via the notification module 316 and communication interface 328 and/or controllers/transceivers 144/140 of the charging segments.

The price paid by the grid to REV operators for grid power contributions and by REV operators to the grid for grid power removals can be handled by the power grid 120 by many techniques. Using REV owner or operator identification information received from REV controllers/transceivers 136/132 or by the notification module 316 via communication interface 328, the power grid 120 can bill the REV owners or operators as part of his or her existing utility bill or separately.

To further influence REV operator behavior during peak power usage periods, routing of power contributing REVs to charging segments can take preference over routing of power consuming or receiving REVs to charging segments to further encourage REV operators to transfer power to the grid. Likewise, during non-peak power usage periods, routing of power consuming REVs to charging segments can take preference over routing of power contributing REVs to charging segments to encourage REV operators to receive power from the grid.

In step 412, the grid load availability evaluator 300 sums the budgeted power load for REV charging received from the grid 120 in step 400 and the estimated amount of WPT from REV users during the selected time interval as the total power from the grid allocated for REV charging.

In step 416, the grid load availability evaluator 300 determines an amount of electrical energy so far consumed by REV charging over the selected time interval, a number of REV vehicles requesting charging during the selected time interval, a number of REV vehicles that have received a charge during the selected time interval, a historic amount of electrical energy consumed by REV charging over similar time intervals in the past, and the like. The grid load availability evaluator 300 then estimates a likely amount of total power to be consumed by REV charging over the selected time interval.

Figure 5:
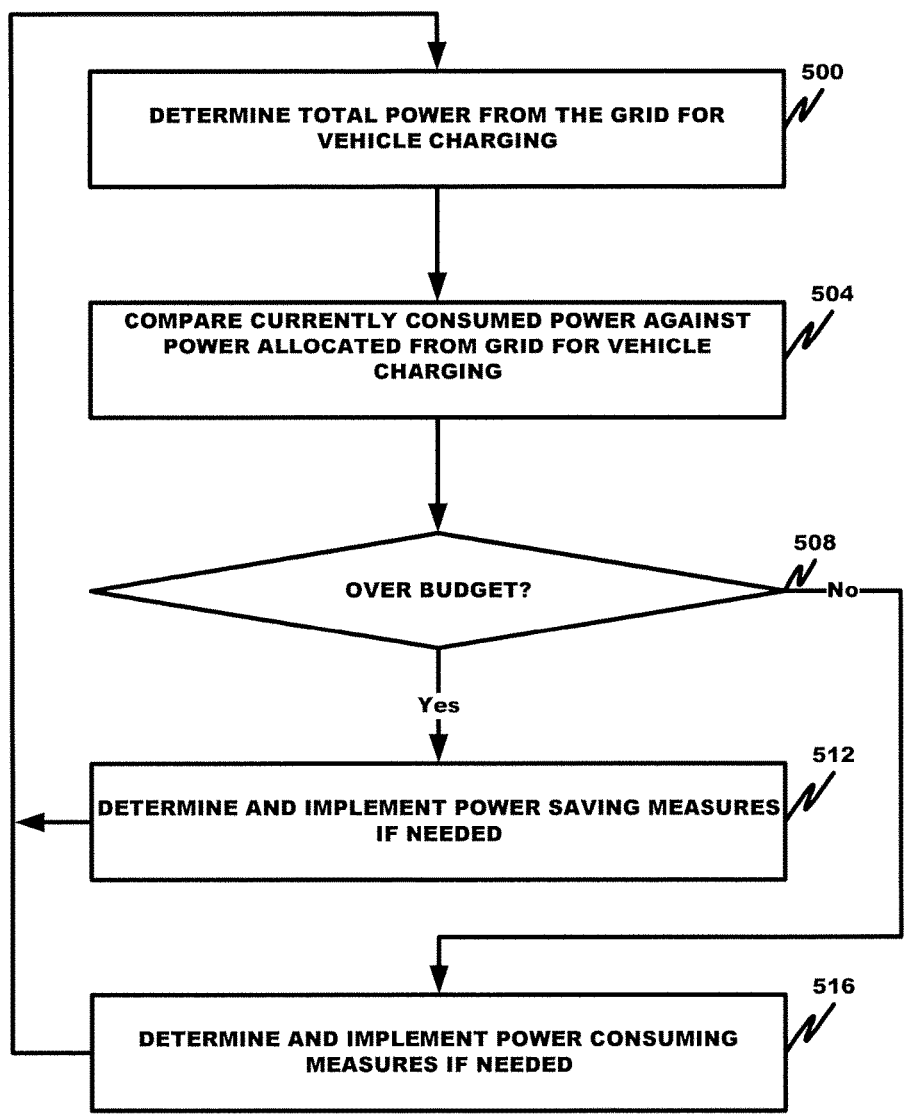
FIG. 5 is a flow chart of logic for the grid load availability evaluator according to an embodiment.

With reference to FIG. 5, the further operation of the grid load availability evaluator 300 will be described.

In step 500, the grid load availability evaluator 300 determines the total power from the grid allocated for REV charging.

In step 504, the grid load availability evaluator 300 compares the likely amount of total power to be consumed by REV charging over the selected time interval against the total budgeted power load for REV charging from step 500.

In decision diamond 508, the grid load availability evaluator 300 determines whether or not there is a shortfall, meaning that the budgeted power load for REV charging is less than the estimated amount of total power to be consumed by REV charging over the selected time interval.

In step 512 when there is a shortfall, the grid load availability evaluator 300, in step 512, notifies the vehicle bidirectional load balance mechanism 308 to request REV users, via the notification module and communication interface, to request REV users to WPT electrical energy to charging segments, refrain from charging REVs, and/or of increased prices for WPT charging by REVs during the selected time interval. Higher priority or level REV users can be treated differently than, or receive different notifications than, lower priority or level REV users. The grid load availability evaluator 300 can also or alternatively request further power from the grid 120.

In step 516 when there is no shortfall but an excess (meaning that the budgeted power load for REV charging is more than the estimated amount of total power to be consumed by REV charging over the selected time interval), the grid load availability evaluator 300 notifies the vehicle bidirectional load balance mechanism 308 to request REV users, via the notification module and communication interface, to request REV users to WPT electrical energy to charging segments, charge REVs, and/or of decreased prices for WPT charging by REVs during the selected time interval. Higher priority or level REV users can be treated differently than, or receive different notifications than, lower priority or level REV users. The grid load availability evaluator 300 can also or alternatively notify the grid 120 of lower estimated power consumption for REV charging over the selected time interval so that the grid 120 can use a portion of the budgeted power for REV charging for other non-REV users.

In some applications, charging rationing measures may be implemented. Even for REVs having a higher charging priority level, a maximum allowed charge to be provided by all charging segments to a selected REV, maximum percentage of charge required by on board energy storage of an REV, or other cap on an amount of charge that can be provided by the charging segments to a selected REV can be mandated to conserve power throughout the charging segments.

Figure 6:
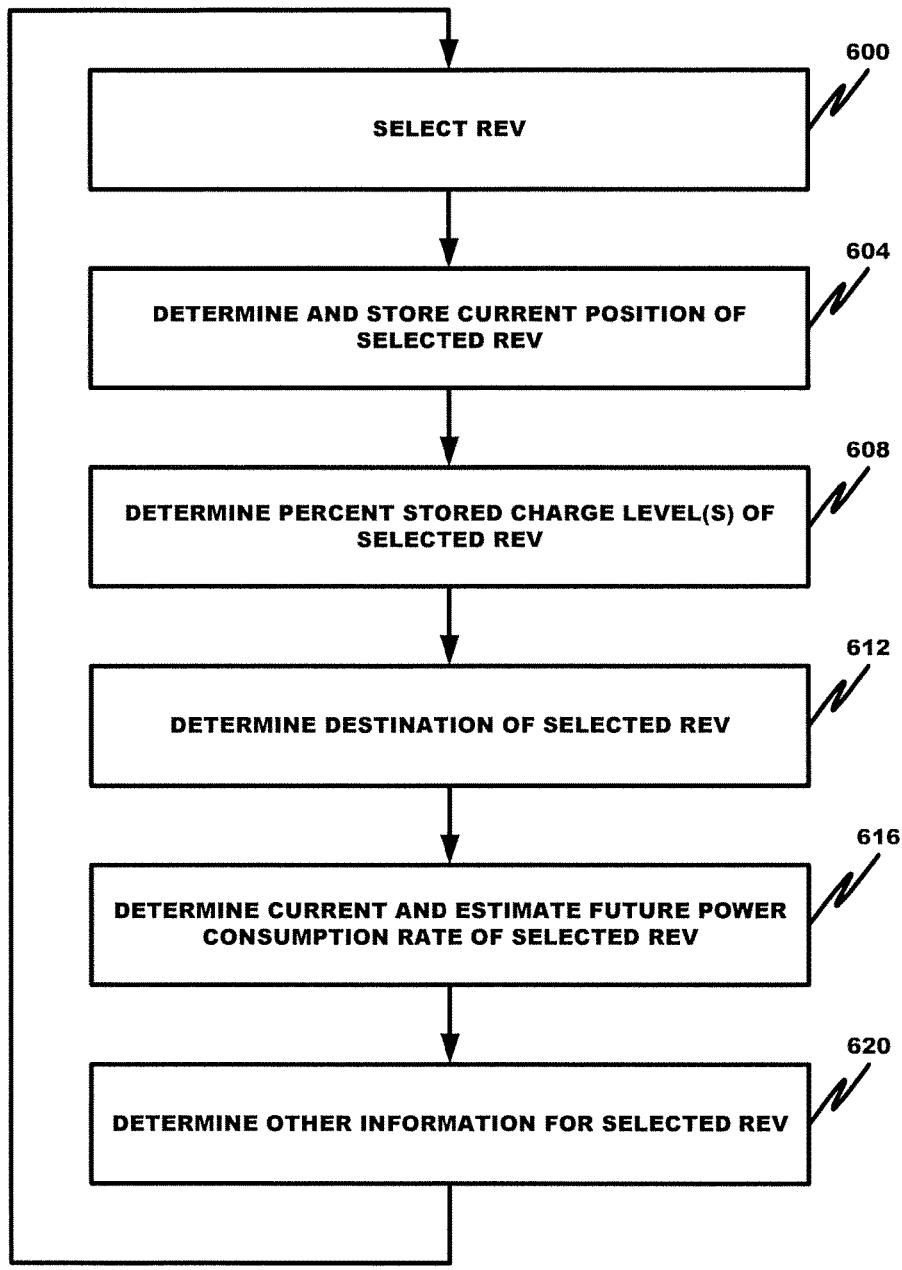
FIG. 6 is a flow chart of logic for the vehicle tracker and analyzer according to an embodiment.

With reference to FIG. 6, the operations of the vehicle tracker 304 and vehicle analyzer 320 will be discussed.

In step 600, the control system selects an REV for analysis. The selection can be done based on REVs currently in operation. These can be identified by the REV logging into the network as part of the sequence of activating the vehicle. It can also be done in response to the REV requesting permission to be charged by a charging segment or attempting to reserve a charging segment for charging. As noted, a transceiver at a charging segment can receive REV information and forward the received REV information to other components in the network. Each REV, including the selected REV, is assigned a unique identifier by the control system for purposes of tracking and analysis. The unique identifier is used globally throughout the network for the selected REV.

In step 604, the vehicle tracker 304 determines, based on the received information, and stores a current position of the selected REV. The position is typically expressed as coordinates of a satellite positioning system, such as GPS, but can be other expressions of position.

In step 608, the vehicle analyzer 320, based on the received information, determines a percent stored charge level(s) of the selected REV.

In step 612, the vehicle tracker 304 and/or vehicle analyzer 320 determine, based on the received information, a destination of the selected REV. This information can be obtained by accessing the on board navigation system of the REV and a selected destination or waypoint. It can also be based on historical tracking records for the vehicle. For example, the REV can commute between business and residence locations at approximately the same times each business day.

In step 616, the vehicle analyzer 320 determines, based on the current position and destination, a current and estimates a future power consumption rate of the selected REV. The vehicle analyzer 320, based on this on board energy storage information, can determine a remaining charge of the REV's on board energy storage when it reaches its destination. The remaining charge can be used to set a level of priority to the REV for charging. When the remaining charge is negative (meaning that the REV does not have sufficient charge to reach its destination) or a very low positive number (meaning that the REV will have a very low level of charge remaining at the destination), the vehicle analyzer 320 assigns a high priority level to the REV for purposes of charging. When the remaining charge is a moderate to high positive number (meaning that the REV will have more than enough charge remaining at the destination), the vehicle analyzer 320 assigns a lower priority level to the REV for purposes of charging.

In step 620, the vehicle analyzer 320 determines other information for the selected REV. Such other information can include the billing information.

Figure 7:
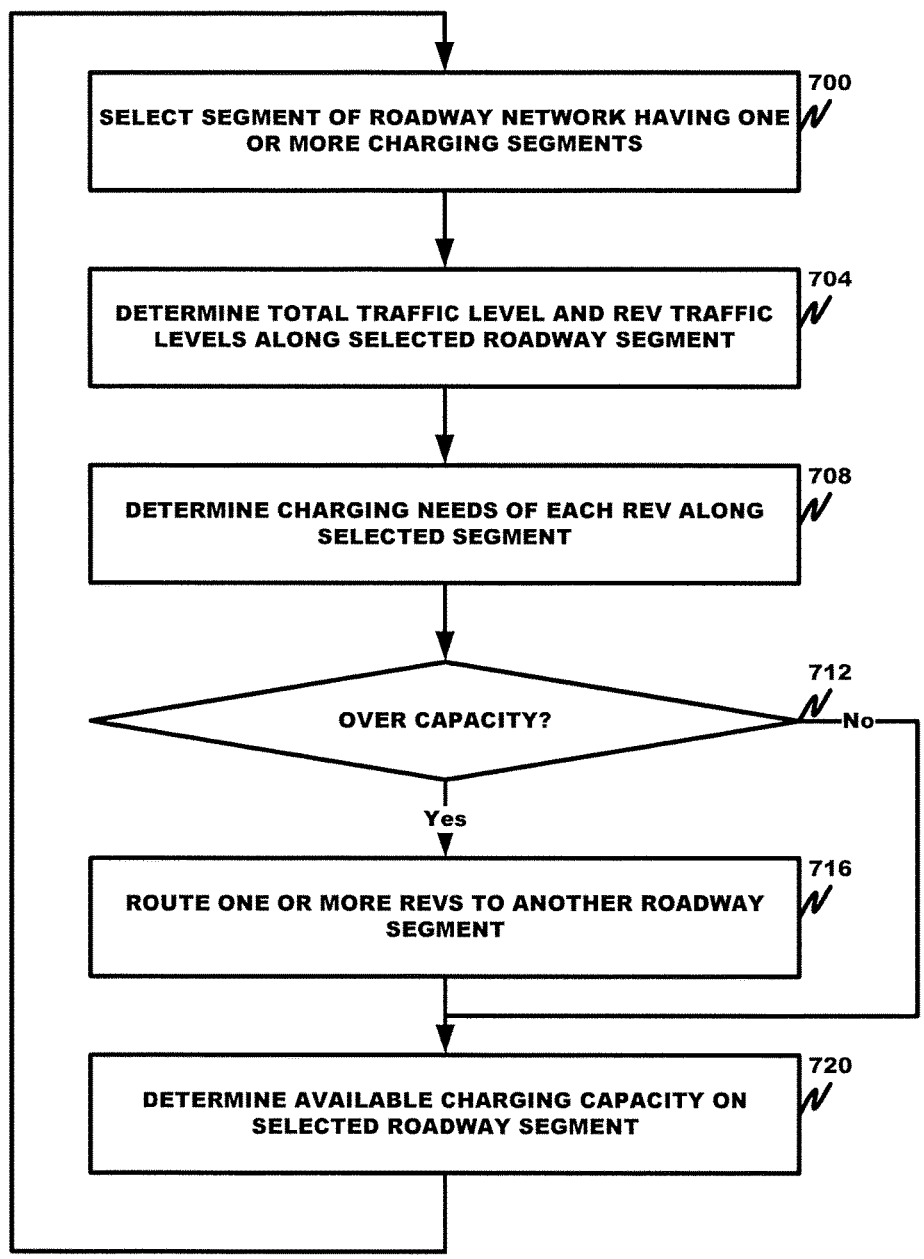
FIG. 7 is a flow chart of logic for the vehicle router according to an embodiment.

Referring now to FIG. 7, the operation of the vehicle router 324 will be discussed.

In step 700, the vehicle router 324 selects a segment of roadway having one or more active charging segments.

In step 704, the vehicle router 324 determines a total traffic level and REV traffic levels along the selected roadway segment. This can be done using REV location and destination information obtained from the vehicle tracker 304 and vehicle analyzer 320.

In step 708, the vehicle router 324, based on information provided by the vehicle analyzer 320, determines the charging needs of each REV along or approaching the selected charging segment.

In decision diamond 712, the vehicle router 324 determines whether or not the selected charging segment is over capacity (or a selected threshold of charging for a selected time interval).

When the selected charging segment is over capacity, the vehicle router 324, in step 716, routes the selected REV to another roadway segment having less used charging segments. The routing decision can include a number of factors, including the type of REV (e.g., law enforcement, fire, road maintenance and other emergency vehicles are given higher priority for the selected charging segment than other types of REVs, REVs having higher charging priority levels can be given higher priority for the selected charging segment than REVs having a lower charging priority level, the destination or next waypoint of the REV and the distance of other charging segments from its path of travel (e.g., the delay caused by re-routing the REV), the current spatial position of the REV relative to the selected charging segment, and the like.

When the selected charging segment is over capacity or after step 716, the vehicle router 324, in step 720, determines the available charging capacity on the selected roadway segment. This is used in a next iteration of step 708. The vehicle router maintains, for each roadway segment and/or charging segment, an indication of a likely level of use of the charging segment by REVs for purposed of routing REVs to less used charging segments. The level of use can be expressed in any suitable form, such as power level likely to be consumed for charging per unit of time, number of REVs traveling the roadway segment, and the like. The information can be maintained in a database and/or as a map that can be provided to human monitors of the control system and/or REV operators.

Figure 8:
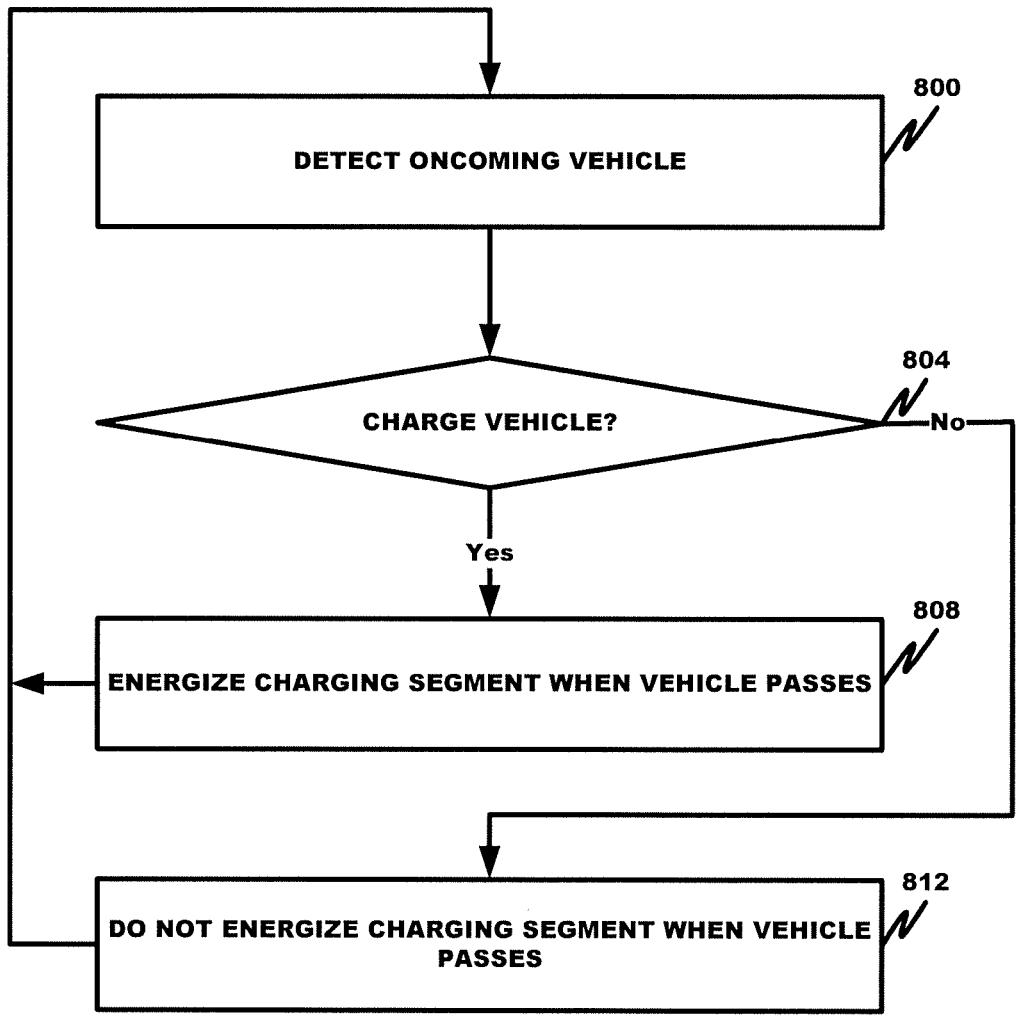
FIG. 8 is a flow chart of logic for the switching fabric according to an embodiment.

FIG. 8 depicts the charging operation of the switching fabric 312.

In step 800, the controller of the charging segment detects an oncoming vehicle, such as using a vehicle sensor or received wireless signal from the transceiver of the vehicle. Typically, the vehicle is detected typically when it is within less than 30 and more typically within 10 seconds of passing over the charging segment.

In decision diamond 804, the controller of the charging segment determines whether or not the corresponding charging segment is to charge the vehicle. The vehicle is not charged when it is not an REV. This would not only be a waste of electrical energy but also potentially impact adversely the vehicle occupants. If the vehicle is detected and it is either positively identified as a non-REV or not positively identified as an REV, the vehicle is not charged. Even if the vehicle is positively identified as an REV, the switching fabric 312 may nonetheless elect not to charge the REV by the charging segment for various reasons. The REV may not require a charge. This can be determined by the REVs controller indicating no charge is required or simply failing to request a charge from the charging segment. Although the REV may request a charge, the switching fabric 312, executing instructions from the control system, may elect not to provide a charge due to a low charging priority of the vehicle, charge rationing, potential overuse of the charging segment, and the like.

When the oncoming vehicle is to be charged, the switching fabric, in step 808, energizes the charging segment when the vehicle passes over the segment.

When the oncoming vehicle is not to be charged, the switching fabric, in step 812, does not energize the charging segment when the vehicle passes over the segment.

Figure 11:
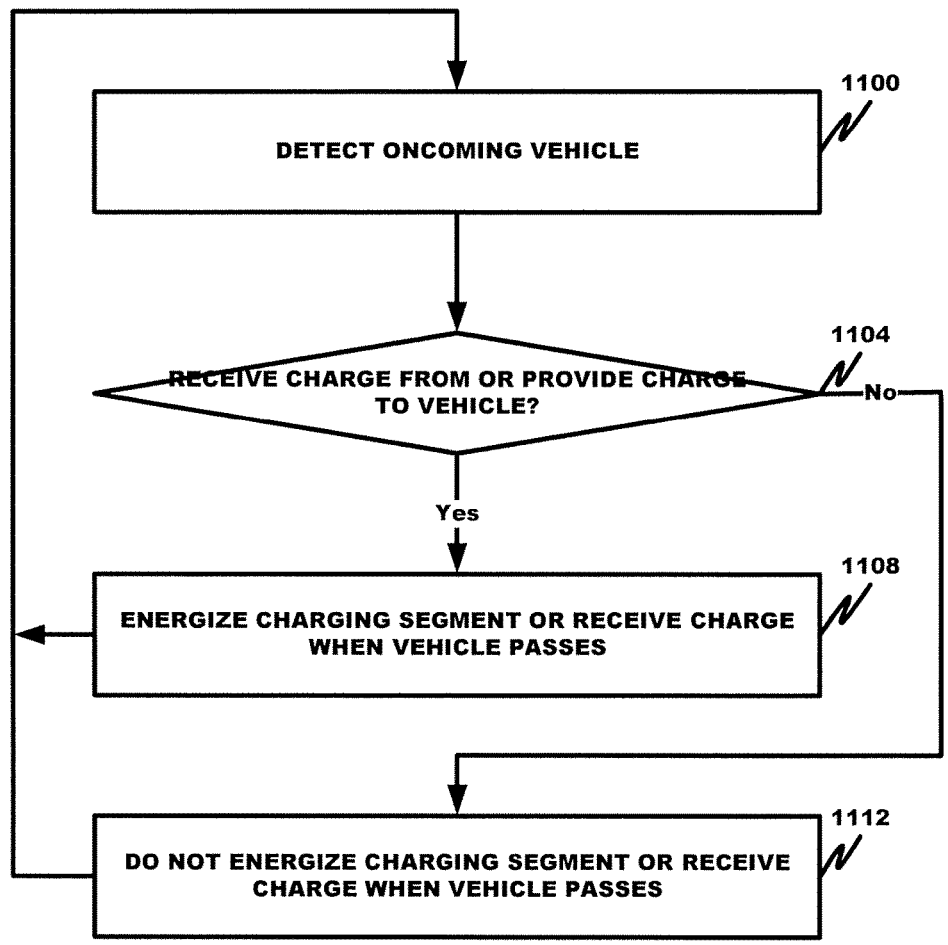
FIG. 11 is a flow chart of logic for the switching fabric according to an embodiment.

FIG. 11 depicts an alternative operation of the switching fabric 312 for a smart grid application.

In step 1100, the controller of the charging segment detects an oncoming vehicle, such as using a vehicle sensor or received wireless signal from the transceiver of the vehicle. Typically, the vehicle is detected typically when it is within less than 30 and more typically within 10 seconds of passing over the charging segment.

In decision diamond 1104, the controller of the charging segment determines whether or not the corresponding charging segment is to charge the vehicle or receive charge from the vehicle. The vehicle is not charged or no charge is received when it is not an REV. If the vehicle is detected and it is either positively identified as a non-REV or not positively identified as an REV, the vehicle is not charged or no attempt is made to receive a charge from the vehicle. Even if the vehicle is positively identified as an REV, the switching fabric 312 may nonetheless elect not to charge the REV by the charging segment or receive charge from the REV to the charging segment for various reasons. The REV may not require a charge from or intend to provide a charge to the charging segment. This can be determined by the REVs controller indicating no charge is required or will be provided or simply failing to request a charge from the charging segment and/or request that the charging segment be prepared to receive a charge from the REV. Although the REV may request a charge, the switching fabric 312, executing instructions from the control system, may elect not to provide a charge due to a low charging priority of the vehicle, charge rationing, potential overuse of the charging segment, and the like.

When the oncoming vehicle is to be charged or a charge is to be provided by the vehicle, the switching fabric, in step 808, configures the charging segment as appropriate when the vehicle passes over the segment.

When the oncoming vehicle is not to be charged or no charge is to be received, the switching fabric, in step 812, does not configure the charging segment when the vehicle passes over the segment.

In other embodiments, the charging segment 128 is a utility power line that is part of the grid. The naturally occurring electromagnetic fields surrounding the power line can be used by vehicles passing over the roadways to charge their rechargeable energy storage 104. The secondary pickup coil 112 of the vehicle is normally substantially normal or perpendicular to the electromagnetic field.

Other charging segment configurations can be employed. In one configuration, a charging segment includes a fiber optic line embedded in the roadway carries an intense beam of monochromatic light (or other electromagnetic radiation) produced by a laser device that generates an intense beam of coherent (e.g., having one wavelength) and focused monochromatic light (or other electromagnetic radiation) by stimulated emission of photons from excited atoms or molecules. A photovoltaic assembly, or a semiconductor diode that converts visible light into direct current (DC), is positioned at the charging location to convert the coherent and monochromatic light into (DC) electrical energy. The process is both physical and chemical in nature, as the first step involves the photoelectric effect from which a second electrochemical process takes place involving crystallized atoms being ionized in a series, generating an electric current. Photovoltaic power generation employs panels comprising a number of solar cells containing a photovoltaic material. Materials presently used for photovoltaics include monocrystalline silicon, polycrystalline silicon, amorphous silicon, cadmium telluride, and copper indium gallium selenide/sulfide. The DC electrical energy is passed through an inverter as described above to provide electrical charge to a vehicle.

This approach can also be used to effect electrical energy transfer between vehicles. The first vehicle 1600 comprises a laser powered by an on board rechargeable energy storage while the second vehicle 1604 comprises a photovoltaic assembly that converts the received coherent and monochromatic light into DC electrical energy for storage in the second vehicle's on board rechargeable energy storage.

Figure 18:
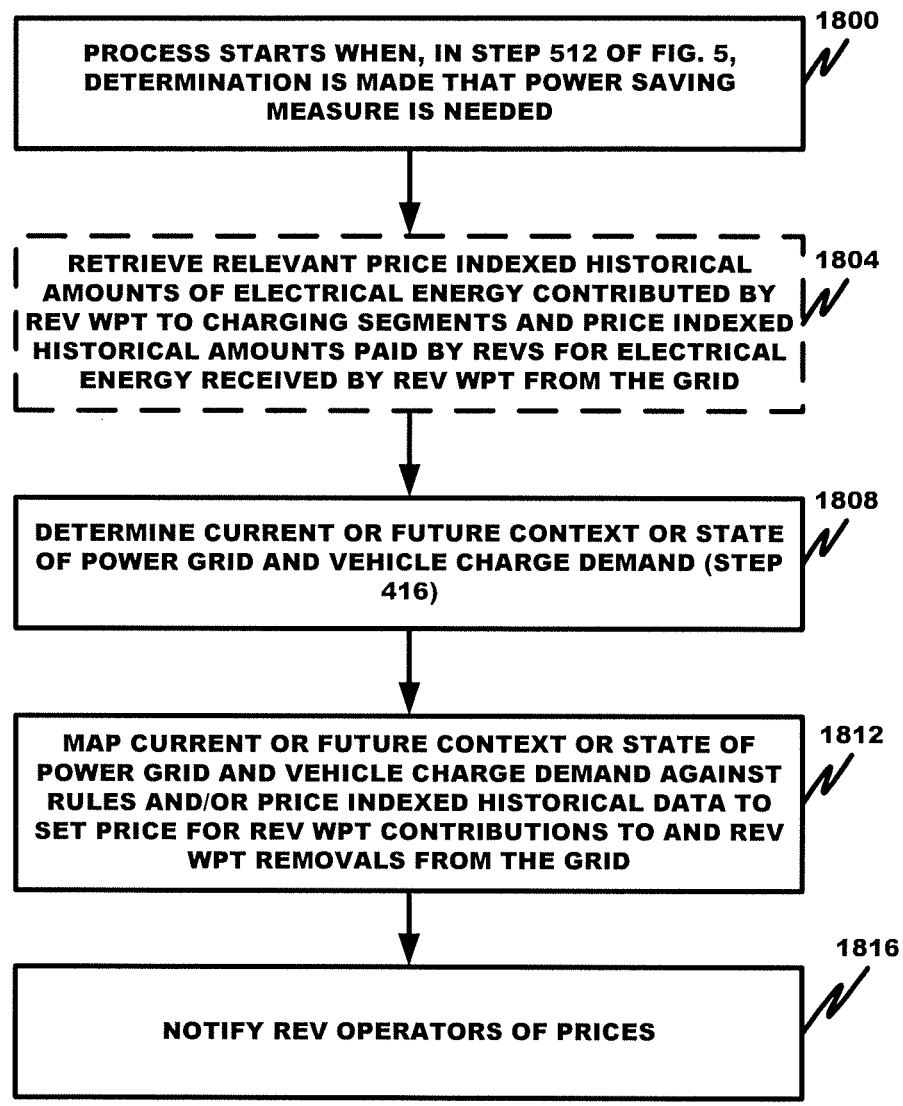
FIG. 18 is a flow chart of logic for setting prices for power contributions to and removals from the grid.

Referring now to FIG. 18, other operations of the grid load availability evaluator 300 and/or vehicle bidirectional load balance mechanism 308 will be discussed.

In step 1800, the process logic starts when, in step 512 of FIG. 5, a determination is made that a power saving measure is needed.

In step 1804, the grid load availability evaluator 300 and/or vehicle bidirectional load balance mechanism 308 optionally retrieves relevant price indexed historical amounts of electrical energy contributed by REV WPT to charging segments and price indexed historical amounts paid by REV operators for electrical energy received by REV WPT from charging segments. The price-indexed historic amounts of electrical energy contributed or removed by REV WPT to or from the charging segments over similar time intervals can predict the likely amount of WPT to be provided by REVs over the selected time interval.

In step 1808, the grid load availability evaluator 300 and/or vehicle bidirectional load balance mechanism 308 determines a current or future context and/or state of the power or utility grid and the vehicle charge demand (step 416 of FIG. 4). The context or state of the power or utility grid can include whether the current or future time is a peak or non-peak power usage period for a class of power consumers (such as residential consumers, REV consumers, commercial consumers, and the like), current or future power load available from the grid for vehicle charging (step 404), current or future available power contributions from vehicles to the power grid (step 408), current or future power from the grid allocated for vehicle charging (step 412), current or future power output by the grid, and the like.

In step 1812, the grid load availability evaluator 300 and/or vehicle bidirectional load balance mechanism 308 maps the current or future context or state of the power grid and vehicle charge demand against rules and/or historical data to set prices for REV WPT contributions to the grid (e.g., the price/power unit paid to REV WPT power contributions) and for REV WPT removals from the grid (e.g., the price/power unit paid by REVs for WPT power removals).

In step 1816, the grid load availability evaluator 300 and/or vehicle bidirectional load balance mechanism 308, via the notification module 316 and communication interface 328, notifies REV operators of the prices set.

Figure 19:
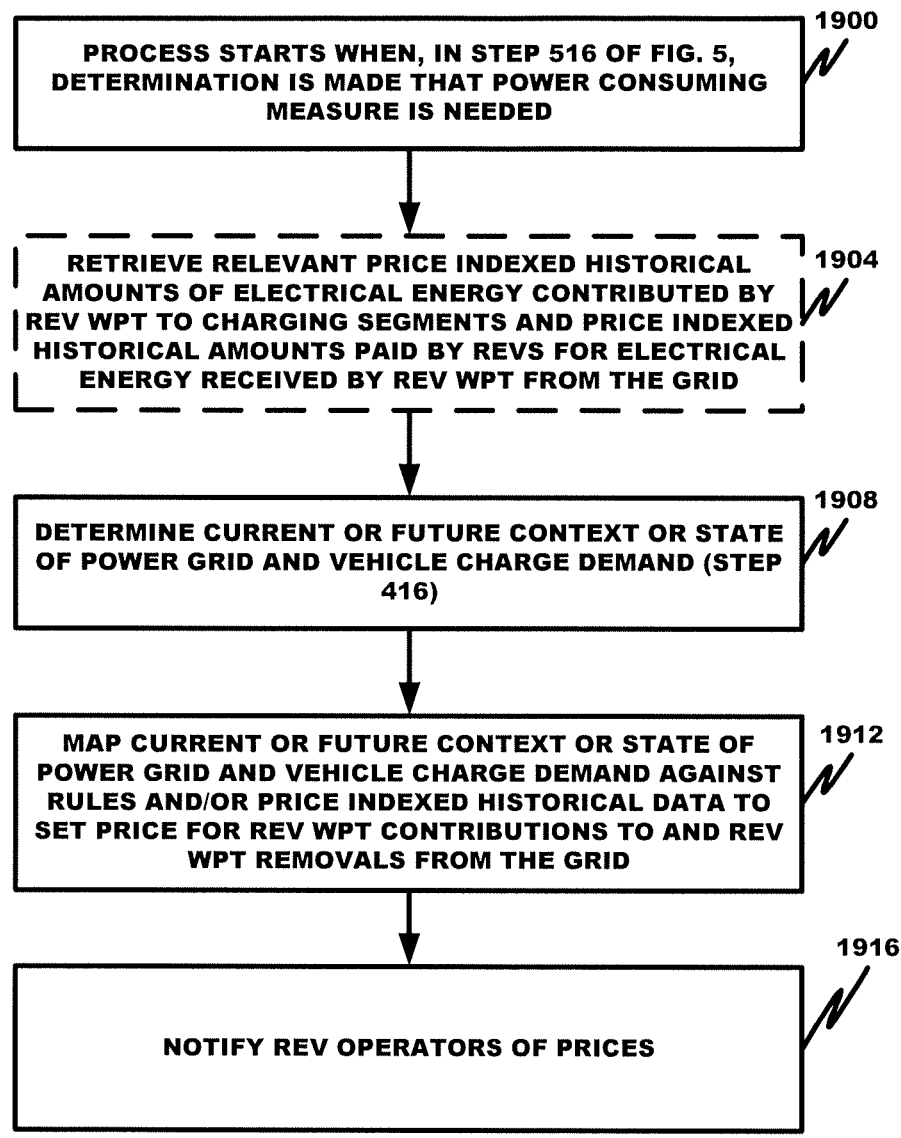
FIG. 19 is a flow chart of logic for setting prices for power contributions to and removals from the grid.

Referring now to FIG. 19, yet other operations of the grid load availability evaluator 300 and/or vehicle bidirectional load balance mechanism 308 will be discussed.

In step 1900, the process logic starts when, in step 516 of FIG. 5, a determination is made that a power consuming measure is needed.

In step 1904, the grid load availability evaluator 300 and/or vehicle bidirectional load balance mechanism 308 optionally retrieves relevant price indexed historical amounts of electrical energy contributed by REV WPT to charging segments and price indexed historical amounts paid by REV operators for electrical energy received by REV WPT from charging segments.

In step 1908, the grid load availability evaluator 300 and/or vehicle bidirectional load balance mechanism 308 determines a current or future context and/or state of the power or utility grid and the vehicle charge demand (step 416 of FIG. 4).

In step 1912, the grid load availability evaluator 300 and/or vehicle bidirectional load balance mechanism 308 maps the current or future context or state of the power grid and vehicle charge demand against rules and/or historical data to set prices for REV WPT contributions to the grid (e.g., the price/power unit paid to REV WPT power contributions) and for REV WPT removals from the grid (e.g., the price/power unit paid by REVs for WPT power removals).

In step 1916, the grid load availability evaluator 300 and/or vehicle bidirectional load balance mechanism 308, via the notification module 316 and communication interface 328, notifies REV operators of the prices set.

Figure 17:
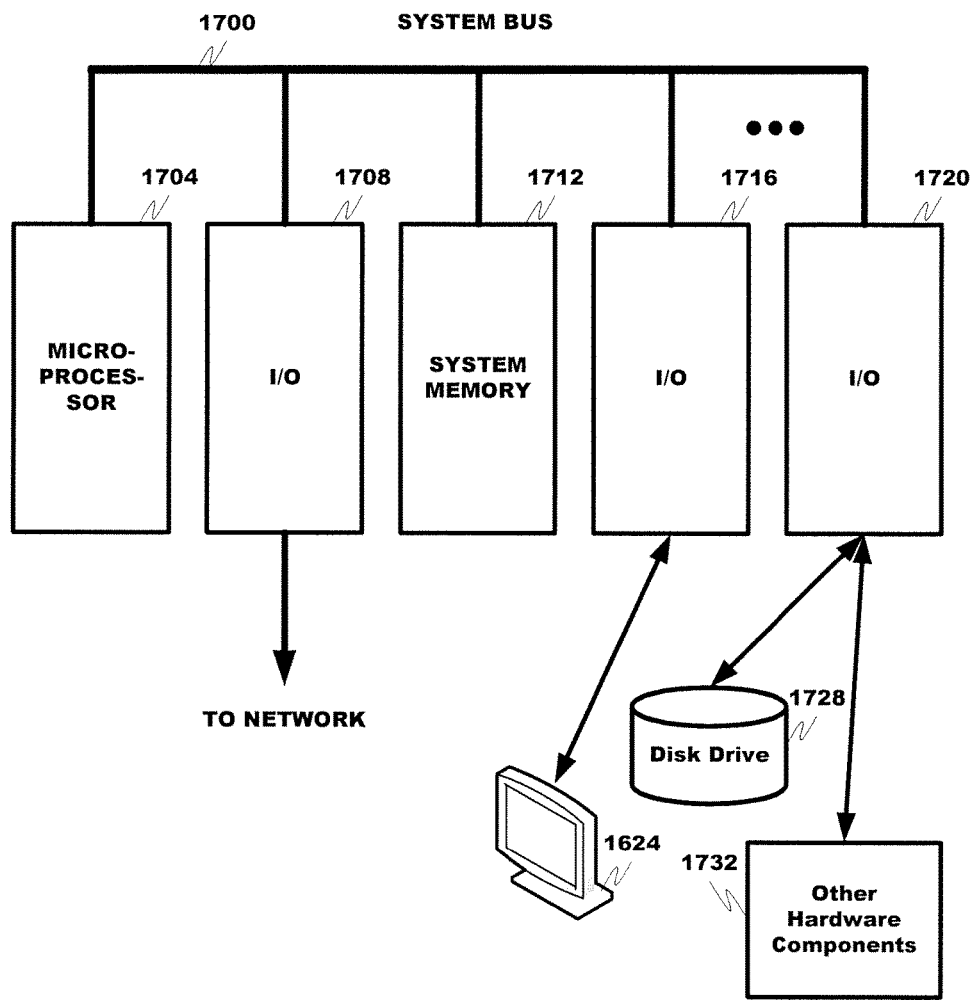
FIG. 17 is a block diagram of an embodiment of a machine to perform operations described in this disclosure.

The subject matter of the disclosure can be implemented through a computer program operating on a programmable computer system or instruction execution system such as a personal computer or workstation, or other microprocessor-based platform. FIG. 17 illustrates details of a computer system that is implementing the teachings of this disclosure, such as operating the controller 144, controller 136, or control system 208 (or a component thereof). System bus 1700 interconnects the major hardware components. The system is controlled by microprocessor 1704, which serves as the central processing unit (CPU) for the system. System memory 1712 is typically divided into multiple types of memory or memory areas such as read-only memory (ROM), random-access memory (RAM) and others. The system memory 1712 can also contain a basic input/output system (BIOS). A plurality of general input/output (I/O) adapters or devices 1708, 1716, and 1720 are present. Only three, namely I/O adapters or devices 1708, 1716, and 1720, are shown for clarity. These connect to various devices including a fixed disk drive 1728, network 216, a display 1724, and other hardware components 1732, such as a diskette drive, a camera or other image capture device, a keyboard, a microphone, a speaker, and the like. Computer program code instructions for implementing the functions disclosed herein can be stored in the disk drive 1728. When the system is operating, the instructions are at least partially loaded into system memory 1712 and executed by microprocessor 1704. Optionally, one of the I/O devices is a network adapter or modem for connection to the network, which may be the Internet. It should be noted that the system of FIG. 17 is meant as an illustrative example only. Numerous types of general-purpose computer systems are available and can be used. When equipped with an image capturing device, a microphone and a speaker, the computer system may be used to implement a conference endpoint.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to distributed processing networks. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the vehicle is a vehicle other than an automobile, such as a motorcycle.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A control system for a power grid, comprising:
    a processor; and
    a non-transitory computer readable medium, coupled to the processor, comprising processor executable instructions that, when executed, cause the processor to:
        determine, for a selected time interval, an amount of electrical energy from a power grid that can be used to charge rechargeable electric vehicles by a plurality of charging segments, the charging segments being positioned along transportation routes in a transportation network; and
        regulate, via a switching fabric and over the selected time interval, the electrical energy provided by the charging segments in accordance with the determined amount of electrical energy from the power grid that can be used to charge rechargeable vehicles,
        wherein the determined amount of electrical energy from the power grid that can be used to charge rechargeable vehicles is dependent upon one or more of current power consumption levels by grid users other than rechargeable electric vehicles, historical power consumption levels by rechargeable electric vehicles and/or other grid users, and a number of rechargeable electric vehicles currently on the transportation network.

2. The control system of claim 1, wherein at least one of the charging segments is positioned in at least one of the transportation routes in which the rechargeable vehicles are intended to be in motion so that the at least one of the charging segments charges the rechargeable vehicles while in motion.

3. The control system of claim 2, wherein the non-transitory computer readable medium further comprises instructions that cause the processor to:
    identify rechargeable electric vehicles currently using the transportation network and tracks a last known position in the transportation network of each of the identified rechargeable electric vehicles; and
    direct the identified rechargeable electric vehicles to one of the charging segments to receive a charge, thereby load balancing the rechargeable electric vehicles over the plurality of charging segments.

4. The control system of claim 2, wherein the non-transitory computer readable medium further comprises instructions that cause the processor to:

communicate with each of the rechargeable electric vehicles to obtain information regarding one or more of identity of the owner or operator of the rechargeable electric vehicle, residence of the rechargeable electric vehicle owner or operator, utility account of the rechargeable electric vehicle owner or operator, type of the rechargeable electric vehicle, priority level of the rechargeable electric vehicle, make and/or model of the rechargeable electric vehicle, current charge level of the rechargeable energy storage of the rechargeable electric vehicle, current charging requirement of the rechargeable energy storage of the rechargeable electric vehicle, destination of the rechargeable electric vehicle, purpose of the current travel of the rechargeable electric vehicle, spatial location of the rechargeable electric vehicle relative to a charging segment, an electronic calendar of an operator of the vehicle, a normal schedule for the operator, and number of occupants of the rechargeable electric vehicle, determine, for each rechargeable electric vehicle, one or more of an amount of electrical charge stored by the rechargeable electric vehicle and an amount of charge currently required by the rechargeable electric vehicle; and direct, based on the one or more of an amount of electrical charge stored by the rechargeable electric vehicle and an amount of charge currently required by the rechargeable electric vehicle, each of the rechargeable electric vehicles to one of the charging segments to receive a charge, thereby load balancing the rechargeable electric vehicles over the plurality of charging segments.

5. The system of claim 1, wherein the non-transitory computer readable medium further comprises instructions that cause the processor to:

determine a current energy usage for all grid users, including rechargeable electric vehicles, and/or estimates future usage over the selected time interval for all grid users; and set, based on the relative priorities of different classes of grid users, a budget for each class of grid users, the rechargeable electric vehicles being a class of grid users and the budget for each class of grid users being an amount of electrical energy from the power grid that can be used by the class of grid users over the selected time interval.

6. The system of claim 5, wherein the non-transitory computer readable medium further comprises instructions to cause the processor:

estimate available power contributions from rechargeable electric vehicles to the power grid over the selected time interval; and provide the estimated available power contribution to the grid load availability evaluator for use in determining the budgets for each class of grid users.

7. The system of claim 1, wherein the computer readable medium further comprises instructions to cause the processor to:

determine an amount of electrical energy so far consumed by rechargeable electric vehicles over the selected time interval, a number of rechargeable electric vehicles requesting a charge during the selected time interval, a number of rechargeable electric vehicles that have received a charge during the selected time interval, and/or a historic amount of electrical energy consumed by rechargeable electric vehicle charging over a historic time interval; and estimate, based on the one or more of the amount of electrical energy so far consumed by rechargeable electric vehicles over the selected time interval, number of rechargeable electric vehicles requesting a charge during the selected time interval, number of rechargeable electric vehicles that have received a charge during the selected time interval, and/or historic amount of electrical energy consumed by rechargeable electric vehicle charging over a historic time interval, a likely amount of power from the grid to be consumed by rechargeable electric vehicles over the remainder of the selected time interval.

8. A method, comprising:

determining for a selected time interval, by a processor executing instructions on a non-transitory computer readable medium, an amount of electrical energy from a power grid that can be used to charge rechargeable electric vehicles by a plurality of charging segments, the charging segments being positioned along transportation routes in a selected transportation network; and providing, by a switching fabric, over the selected time period the determined amount of electrical energy to charge rechargeable vehicles, wherein the determined amount of electrical energy from the power grid that can be used to charge rechargeable vehicles depends upon one or more of current power consumption levels by grid users other than rechargeable electric vehicles, historical power consumption levels by rechargeable electric vehicles and/or other grid users, and a number of rechargeable electric vehicles currently on the selected transportation network.

9. The method of claim 8, wherein at least one of the charging segments is positioned in at least one of the transportation routes in which the rechargeable vehicles are intended to be in motion so that the at least one of the charging segments charges the rechargeable vehicles while in motion.

10. The method of claim 8, further comprising:

identifying, by the processor, rechargeable electric vehicles currently using the transportation network and tracking a last known position in the transportation network of each of the identified rechargeable electric vehicles; and directing, by the processor, the identified rechargeable electric vehicles to one of the charging segments to receive a charge, thereby load balancing the rechargeable electric vehicles over the plurality of charging segments.

11. The method of claim 10, further comprising:

communicating, by the processor, with each of the rechargeable electric vehicles to obtain information regarding one or more of identity of the owner or operator of the rechargeable electric vehicle, residence of the rechargeable electric vehicle owner or operator, utility account of the rechargeable electric vehicle owner or operator, type of the rechargeable electric vehicle, priority level of the rechargeable electric vehicle, make and/or model of the rechargeable electric vehicle, current charge level of the rechargeable energy storage of the rechargeable electric vehicle, current charging requirement of the rechargeable energy storage of the rechargeable electric vehicle, destination of the rechargeable electric vehicle, purpose of the current travel of the rechargeable electric vehicle, spatial location of the rechargeable electric vehicle relative to a charging segment, an electronic calendar of an operator of the vehicle, a normal schedule for the operator, and number of occupants of the rechargeable electric vehicle;

determining, by the processor for each rechargeable electric vehicle, one or more of an amount of electrical charge stored by the rechargeable electric vehicle and an amount of charge currently required by the rechargeable electric vehicle; and directing, by the processor based on the one or more of an amount of electrical charge stored by the rechargeable electric vehicle and an amount of charge currently required by the rechargeable electric vehicle, each of the rechargeable electric vehicles to one of the charging segments to receive a charge, thereby load balancing the rechargeable electric vehicles over the plurality of charging segments.

12. The method of claim 8, wherein the determining, by the processor, includes:

determining a current energy usage for all grid users, including rechargeable electric vehicles, and/or estimates future usage over the selected time interval for all grid users; and setting, based on the relative priorities of different classes of grid users, a budget for each class of grid users, the rechargeable electric vehicles being a class of grid users and the budget for each class of grid users being an amount of electrical energy from the power grid that can be used by the class of grid users over the selected time interval.

13. The method of claim 12, further comprising:

estimating, by the processor available power contributions from rechargeable electric vehicles to the power grid over the selected time interval; and providing the estimated available power contribution to the grid load availability evaluator for use in determining the budgets for each class of grid users.

14. The method of claim 8, further comprising:

determining, by the processor, an amount of electrical energy so far consumed by rechargeable electric vehicles over the selected time interval, a number of rechargeable electric vehicles requesting a charge during the selected time interval, a number of rechargeable electric vehicles that have received a charge during the selected time interval, and/or a historic amount of electrical energy consumed by rechargeable electric vehicle charging over a historic time interval; and estimating, by the processor and based on the one or more of the amount of electrical energy so far consumed by rechargeable electric vehicles over the selected time interval, number of rechargeable electric vehicles requesting a charge during the selected time interval, number of rechargeable electric vehicles that have received a charge during the selected time interval, and/or historic amount of electrical energy consumed by rechargeable electric vehicle charging over a historic time interval, a likely amount of power from the grid to be consumed by rechargeable electric vehicles over the remainder of the selected time interval.

15. A control system for a rechargeable vehicle charging network, comprising:

a processor; and a non-transitory computer readable medium, coupled to the processor, comprising processor executable instructions that, when executed, program the processor to:

control a switching fabric that regulates, over the selected time period, electrical energy provided by a plurality of charging segments in accordance with a determined amount of electrical energy from a power grid that can be used to charge rechargeable vehicles;

identify rechargeable electric vehicles currently using a transportation network that includes the charging segments and track a last known position in the transportation network of each of the identified rechargeable electric vehicles; and direct the identified rechargeable electric vehicles to one of the charging segments to receive a charge, thereby load balancing the rechargeable electric vehicles over the plurality of charging segments.

16. The control system of claim 15, wherein the determined amount of electrical energy from the power grid that can be used to charge rechargeable vehicles is dependent upon one or more of current power consumption levels by grid users other than rechargeable electric vehicles, historical power consumption levels by rechargeable electric vehicles and/or other grid users, and number of rechargeable electric vehicles currently on the transportation network and wherein the non-transitory computer readable medium further comprises instructions that program the processor to:

determine, for a selected time period, an amount of electrical energy from a power grid that can be used to charge rechargeable electric vehicles by a plurality of charging segments, the charging segments being positioned along transportation routes in the transportation network.

17. The control system of claim 16, wherein at least one of the charging segments is positioned in at least one of the transportation routes in which the rechargeable vehicles are intended to be in motion so that the at least one of the charging segments charges the rechargeable vehicles while in motion.

18. The control system of claim 16, wherein the non-transitory computer readable medium further comprises instructions that program the processor to:

determine a current energy usage for all grid users, including rechargeable electric vehicles, and/or estimates future usage over the selected time interval for all grid users; and set, based on the relative priorities of different classes of grid users, a budget for each class of grid users, the rechargeable electric vehicles being a class of grid users and the budget for each class of grid users being an amount of electrical energy from the power grid that can be used by the class of grid users over the selected time interval.

19. The control system of claim 18, wherein the non-transitory computer readable medium further comprises instructions that program the processor to:

estimate available power contributions from rechargeable electric vehicles to the power grid over the selected time interval and provide the estimated available power contribution to the grid load availability evaluator for use in determining the budgets for each class of grid users.

20. The system of claim 16, wherein the non-transitory computer readable medium further comprises instructions that program the processor to:

determine an amount of electrical energy so far consumed by rechargeable electric vehicles over the selected time interval, a number of rechargeable electric vehicles requesting a charge during the selected time interval, a number of rechargeable electric vehicles that have received a charge during the selected time interval, and/or a historic amount of electrical energy consumed by rechargeable electric vehicle charging over a historic time interval; and estimate, based on the one or more of the amount of electrical energy so far consumed by rechargeable electric vehicles over the selected time interval, number of rechargeable electric vehicles requesting a charge during the selected time interval, number of rechargeable electric vehicles that have received a charge during the selected time interval, and/or historic amount of electrical energy consumed by rechargeable electric vehicle charging over a historic time interval, a likely amount of power from the grid to be consumed by rechargeable electric vehicles over the remainder of the selected time interval.

21. The control system of claim 15, wherein the non-transitory computer readable medium further comprises instructions that program the processor to:

communicate with each of the rechargeable electric vehicles to obtain information regarding one or more of identity of the owner or operator of the rechargeable electric vehicle, residence of the rechargeable electric vehicle owner or operator, utility account of the rechargeable electric vehicle owner or operator, type of the rechargeable electric vehicle, priority level of the rechargeable electric vehicle, make and/or model of the rechargeable electric vehicle, current charge level of the rechargeable energy storage of the rechargeable electric vehicle, current charging requirement of the rechargeable energy storage of the rechargeable electric vehicle, destination of the rechargeable electric vehicle, purpose of the current travel of the rechargeable electric vehicle, spatial location of the rechargeable electric vehicle relative to a charging segment, an electronic calendar of an operator of the vehicle, a normal schedule for the operator, and number of occupants of the rechargeable electric vehicle;

determine, for each rechargeable electric vehicle, one or more of an amount of electrical charge stored by the rechargeable electric vehicle and an amount of charge currently required by the rechargeable electric vehicle; and direct, based on the one or more of an amount of electrical charge stored by the rechargeable electric vehicle and an amount of charge currently required by the rechargeable electric vehicle, each of the rechargeable electric vehicles to one of the charging segments to receive a charge, thereby load balancing the rechargeable electric vehicles over the plurality of charging segments.

* * * * *